United States Patent
Cloke et al.

(10) Patent No.: US 6,178,056 B1
(45) Date of Patent: Jan. 23, 2001

(54) DISK DRIVE EMPLOYING STATE VARIABLE TRAP REGISTERS FOR PROVIDING STORED SERVO AND USER DATA STATE VARIABLES TO SAMPLED-DATA CHANNEL

(75) Inventors: Robert Leslie Cloke, Santa Clara; Richard W. Hull, Laguna Hills; Vafa James Rakshani, Laguna Beach; David Price Turner, Los Gatos, all of CA (US)

(73) Assignee: Western Digital Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/293,487

(22) Filed: Apr. 15, 1999

Related U.S. Application Data

(63) Continuation of application No. 08/815,352, filed on Mar. 11, 1997.

(51) Int. Cl.[7] ............................... G11B 5/09; G11B 5/035
(52) U.S. Cl. .................... 360/46; 360/51; 360/65
(58) Field of Search .................... 360/46, 65, 51

(56) References Cited

U.S. PATENT DOCUMENTS 5,463,603   10/1995   Petersen .
5,796,535   8/1998   Tuttle et al. .
5,822,143   * 10/1998   Cloke et al. ..................... 360/51

* cited by examiner

*Primary Examiner*—Hoa T. Nguyen
*Assistant Examiner*—Regina Y. Neal
(74) *Attorney, Agent, or Firm*—Milad G Shara

(57) ABSTRACT

A disk drive includes a disk surface having a plurality of tracks arranged in an embedded servo format including servo track segments for storing servo data and data track segments for storing user data. The disk drive includes a read element operative during a user-data read operation for reading data from the disk surface to produce a time-multiplexed analog read signal that during a revolution of the disk represents analog read servo data during each of a first set of time intervals and represents analog read user data during each of a second set of time intervals. The disk drive includes a sampled signal processing circuit that generates a servo state variable while processing the time-multiplexed read signal during the first servo time interval and a user data state variable while processing the time-multiplexed read signal during the first user data time interval. The disk drive includes a servo state variable trap register for storing the servo state variable at the end of the first servo time interval. The disk drive includes a data state variable trap register for storing the user data state variable at the end of the first user data time interval. The disk drive includes a control circuit for providing the stored servo state variable to the sampled signal processing circuit at the beginning of the second servo time interval. The control circuit provides the stored user data state variable to the sampled signal processing circuit at the beginning of the second user data time interval.

4 Claims, 16 Drawing Sheets

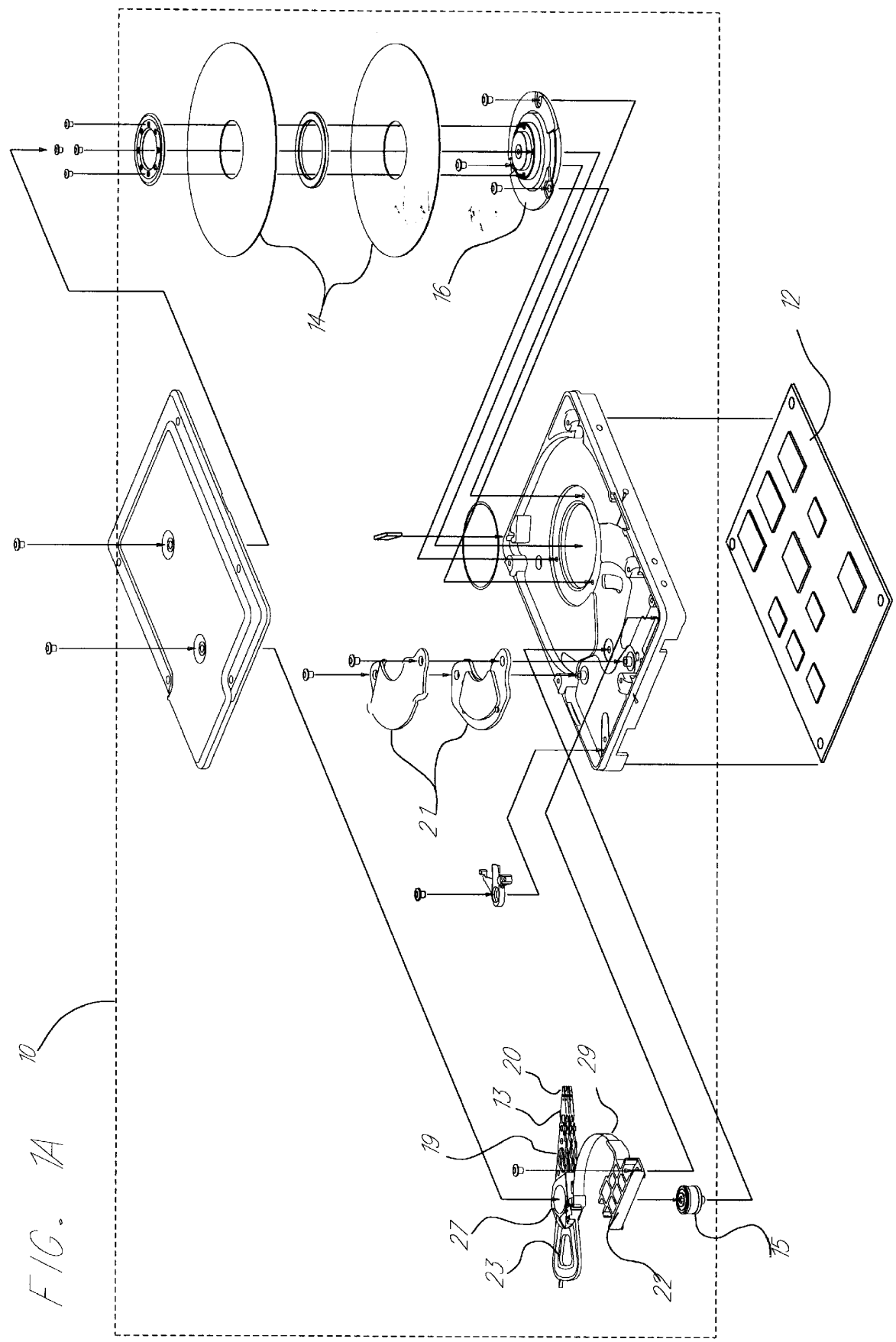

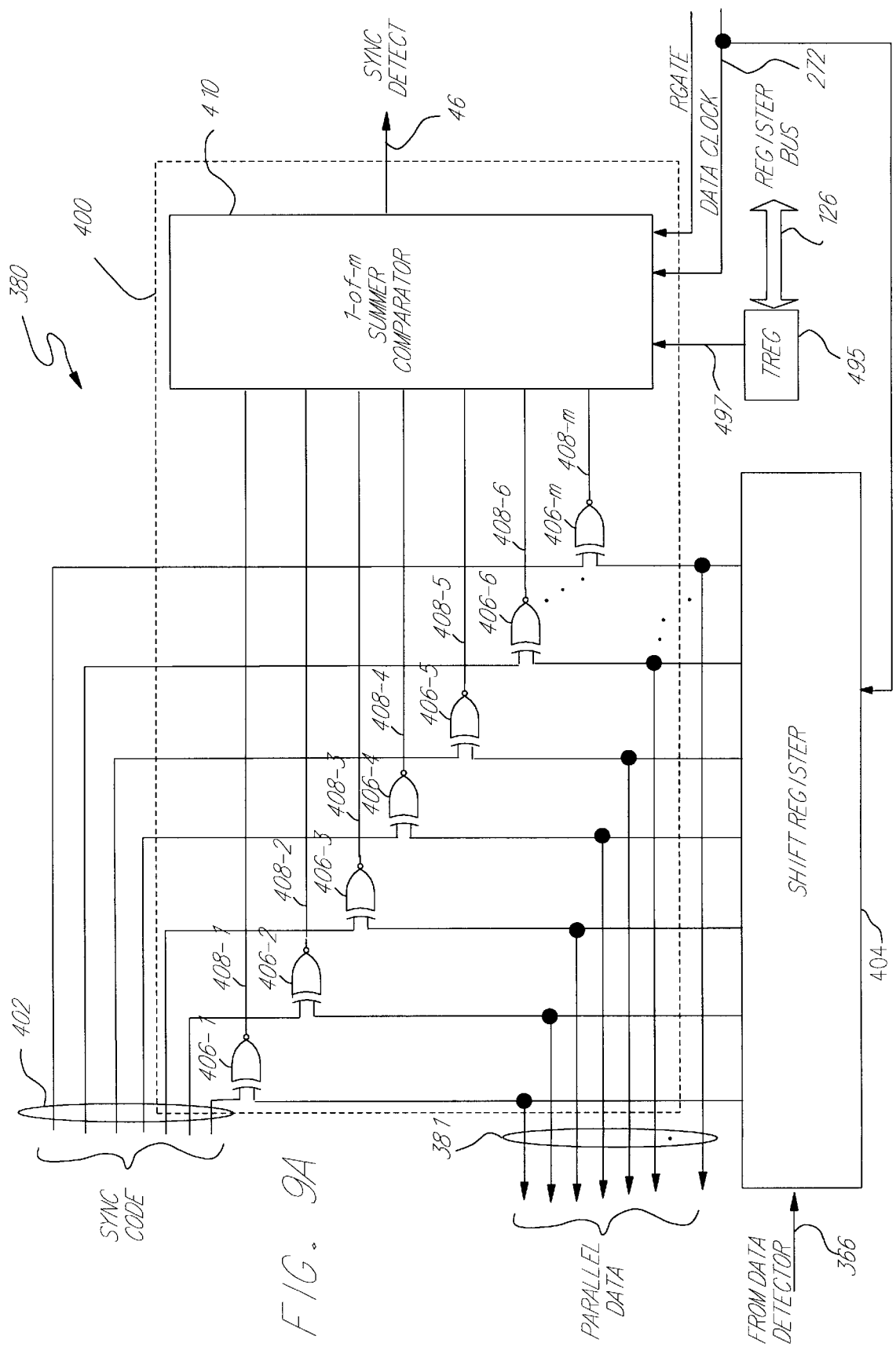

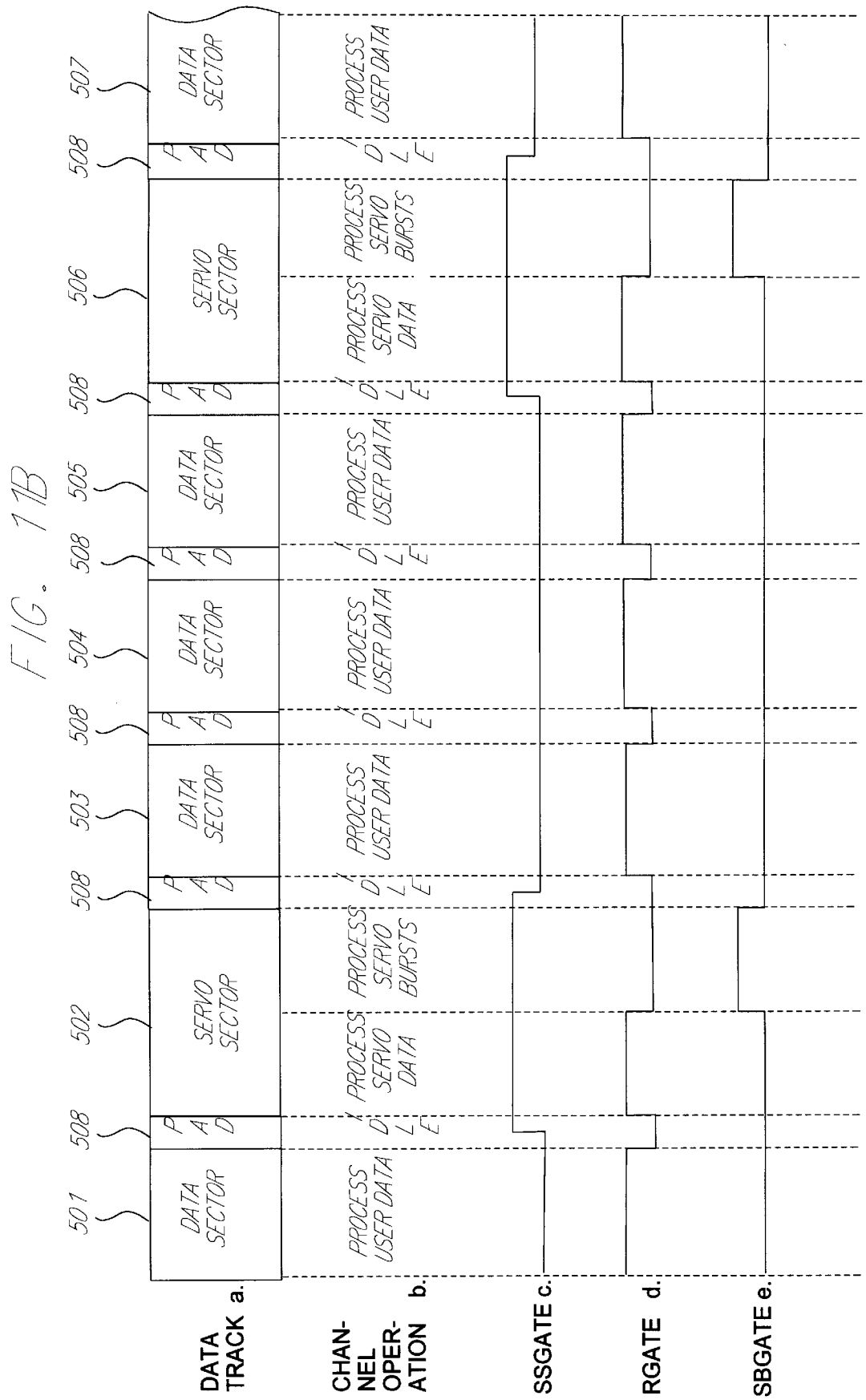

DISK DRIVE EMPLOYING STATE VARIABLE TRAP REGISTERS FOR PROVIDING STORED SERVO AND USER DATA STATE VARIABLES TO SAMPLED-DATA CHANNEL

CROSS-REFERENCE TO RELATED APPLICATIONS

This application is a continuation of commonly owned co-pending patent application Ser. No. 08/815,352, filed Mar. 11, 1997, for DISK DRIVE EMPLOYING READ ERROR TOLERANT SYNC MARK DETECTION.

BACKGROUND OF THE INVENTION

1. Field of the Invention

The present invention relates to hard disk drives. More particularly, the present invention relates to an embedded servo hard disk drive employing state variable trap registers for providing stored servo and user data state variables to sampled-data channel.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives having even higher capacities. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, and high capacity requires a design that provides high format efficiency and high areal storage density. Format efficiency relates to the percentage of available area that is available for storing user data rather than being consumed by control data, gaps, etc. Areal storage density relates to the amount of data storage capacity per unit of area on the recording surfaces of the disks. The available areal density may be determined from the product of the track density measured radially and the linear bit density measured along the tracks.

The available track density depends on numerous factors including the performance capability of a servo system in the hard disk drive which, among other things, provides for track following, i.e., maintaining alignment of a reading or writing transducer with respect to the centerline of a desired track. One type of servo system, sometimes referred to as an "embedded servo" employs servo data on the same disk surface that stores user data to provide signals employed in the operation of the servo system. An embedded servo format for the disk surface has the basic characteristic of a plurality of radially-extending servo-data regions (sometimes referred to as "servo wedges") and an interspersed plurality of radially-extending user-data regions. Each user-data region has a plurality of user-data track segments, and each servo-data region has a plurality of servo-data track segments. In accord with another element of an embedded servo format, the servo data include track-identification data used during track-seeking operations, and burst data used during track-following operations. While data are being read in operation of an embedded servo hard disk drive, a transducer produces a time-multiplexed analog read signal that during a revolution of the disk represents servo data during each of a first set of time intervals; and represents user data during each of a second set of time intervals.

The rate at which servo wedges pass under a reading transducer is referred to as the "servo sample rate." The servo sample rate equals the revolution rate of the rotating disk multiplied by the number of servo wedges per surface. A high servo sample rate is desirable for the purpose of providing a robust servo system. On the other hand, increasing the servo sample rate generally involves allocating more surface area to servo wedges and thereby adversely impacts surface format efficiency.

The available linear bit density depends on numerous factors including the performance capability of certain circuitry that is commonly referred to as a "read channel." One type of read channel is referred to as a peak-detecting channel; another type is referred to as a sampled-data channel. The type referred to as a sampled-data channel is a category including a partial response, maximum likelihood ("PRML") channel, a EPR4 channel, and a $E^2PR4$ channel.

In a hard disk drive having any of these read channels, the read channel receives an analog read signal from a transducer during a read operation. The analog read signal is characterized by a "channel frequency." As used in this art, "channel frequency" is the reciprocal of a time period "T," where the "T" is the time period consumed while an elemental-length magnet passes under the transducer during a read operation with the disk spinning at a constant angular velocity. In this regard, the length of each magnet recorded along a track as a result of a write operation is, to a first order of approximation, either an elemental length or an integer multiple of the elemental length. Each elemental length magnet can be referred to as a "bit cell" that is defined during a write operation.

The analog read signal always contains some random noise. The analog read signal, and certain other signals produced by processing the analog read signal and that also contain noise, are referred to herein as noise-corrupted signals. One such other noise-corrupted signal is a signal produced by filtering the analog read signal by means of a low-pass filter. Such filtering may reduce but not eliminate noise, and the filtered signal is also noise corrupted. Further signal processing in the read channel provides for producing a digital signal comprising detected symbols, any of which can be in error in representing recovered data. Such a digital signal is referred to herein as an error-prone signal.

In a hard disk drive employing a peak detecting channel, digital data are represented in the media by transitions between oppositely magnetized bit cells. Provided that the transitions between oppositely magnetized bit cells do not unduly interfere with each other, each such transition causes a peak in the analog read signal, and a peak-detecting channel employs a peak detector that detects such peaks, and produces digital signal in the form of a serial, binary-valued signal that is an error-prone signal for numerous reasons. One reason why the peak detector produces an error-prone signal is random noise; this source of error presents a problem for any type of channel. Another reason relates to interference between adjacent transitions. Interference between such transitions is referred to as intersymbol interference and adversely affects performance of a peak detetecting channel increasingly as a function of channel rate.

A sampled-data channel employs sampling circuitry that samples a noise-corrupted analog read signal to produce a sequence of noise-corrupted samples. The samples so produced are provided in sequence to a detector such as a so-called 'Viterbi detector" that internally produces error-prone symbols and maps the internally-produced error-prone symbols to binary-valued error-prone symbols. In a PRML channel, such internally-produced error-prone symbols are often referred to as: "−1"; "0"; and "+1"; and the binary-valued error-prone symbols are supplied to a deserializer to produce a parallel-by-bit digital signal.

The sampled-data channel includes servo data detection circuitry and user data detection circuitry. The servo data detection circuitry has an acquisition time interval (acquisition mode) for acquiring appropriate state variables before reading servo data stored in each servo-data track segment. The user data detection circuitry also has an acquisition time interval for acquiring appropriate state variables before reading user data stored in each user-data track segment. A disadvantage with the acquisition time interval is that it can increase the time for accessing servo data and user data.

There is a need for reducing the acquisition time interval for acquiring state variables for the servo data detection circuitry and the user data detection circuitry in the sampled-data channel.

SUMMARY OF THE INVENTION

The invention can be regarded as a disk drive comprising a disk having a disk surface. The disk surface has a plurality of tracks arranged in an embedded servo format including servo track segments for storing servo data and data track segments for storing user data. The disk drive includes read means operative during a user-data read operation for reading data from the disk surface to produce a time-multiplexed analog read signal that during a revolution of the disk represents analog read servo data during each of a first set of time intervals and represents analog read user data during each of a second set of time intervals. The first set of time intervals includes a first servo time interval and a second servo time interval. The second set of time intervals includes a first user data time interval and a second user data time interval. The disk drive includes a sampled signal processing means being responsive to the time-multiplexed analog read signal for producing a plurality of detected read symbols representing recovered servo data and recovered user data. The sampled signal processing means generates a servo state variable while processing the time-multiplexed read signal during the first servo time interval and a user data state variable while processing the time-multiplexed read signal during the first user data time interval. The disk drive includes a servo state variable trap register for storing the servo state variable at the end of the first servo time interval. The disk drive includes a data state variable trap register for storing the user data state variable at the end of the first user data time interval. The disk drive includes a control means for providing the stored servo state variable to the sampled signal processing means at the beginning of the second servo time interval. The control means provides the stored user data state variable to the sampled signal processing means at the beginning of the second user data time interval.

The foregoing and other features of the invention are described in detail below and set forth in the appended claims.

BRIEF DESCRIPTION OF THE DRAWINGS

FIG. 1A is an exploded perspective view of a disk drive embodying the invention.

FIG. 9A is a block diagram of a suitable implementation of a shared pattern detector 380 of FIG. 7.

FIG. 11B is a timing diagram showing the relationship between servo gate (SGATE), read gate (RGATE), burst gate (BGATE) and information recorded in a disk track segment.

DETAILED DESCRIPTION

HARD DISK DRIVE ("HDD") ASSEMBLY

Figure 1B:
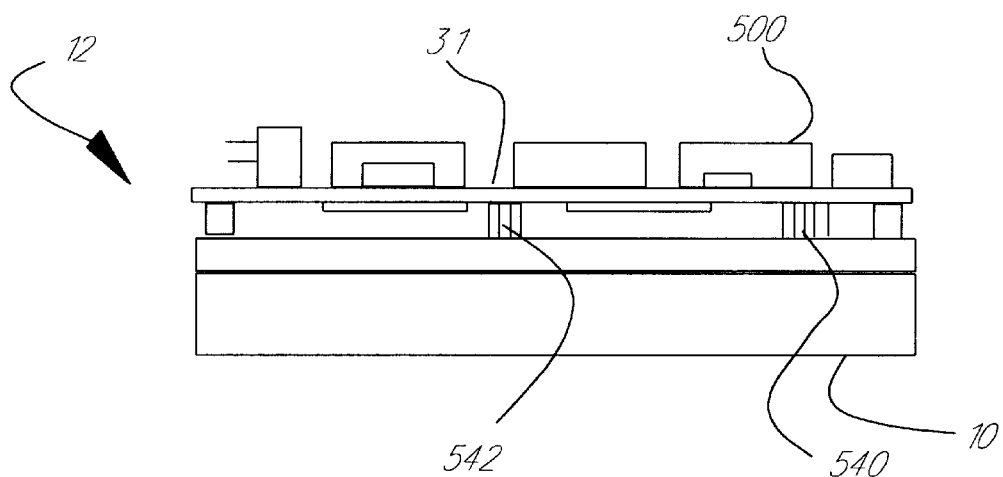
FIG. 1B is a side view of the disk drive of FIG. 1A.

Referring to FIG. 1A, a hard disk drive in accordance with a preferred embodiment of the invention includes a head disk assembly ("HDA 10") and a printed circuit board assembly ("PCBA 12").

HDA 10 includes a suitable number of magnetic disks 14 (two disks being shown in FIG. 1A), a pivot bearing cartridge 15, a spindle motor 16, a voice coil motor ("VCM 18" in FIG. 1D), a head stack assembly ("HSA 19"), and a plurality of permanent magnets 21 for VCM 18. HSA 19 includes a coil 23, an actuator frame 27, and a suitable number of head gimbal assemblies each including a transducer suspension 13 and a slider or head that includes a read transducer 20. A suitable read transducer is an inductive transducer. A magneto-resistive ("MR") transducer is also suitable; a slider containing an MR transducer for reading generally also includes an inductive transducer for writing. HSA 19 also suitably includes a flex circuit assembly that includes a flex circuit 29, a preamplifier ("preamp 22"), a plurality of passive electrical components that include resistors, capacitors, connectors, and suitable mounting hardware.

Figure 1C:
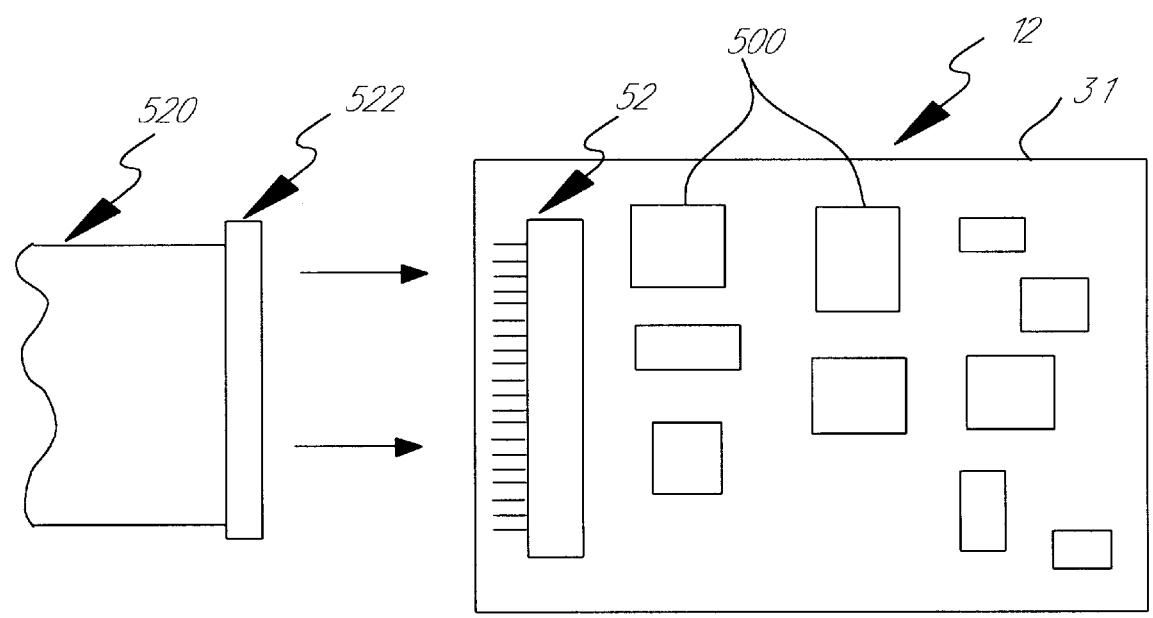
FIG. 1C is a plan view of a portion of the disk drive of FIG. 1A, together with a cable for connecting the disk drive to a host system.

Referring to FIG. 1B and FIG. 1C, PCBA 12 includes a printed circuit board ("PCB 31") and a plurality of integrated circuits ("ICs 500"), some of which are disposed on one side of PCB 31 and others of which are disposed on the opposite side of PCB 31. PCBA 12 further includes a plurality of active and passive electrical components, and connectors for connecting PCBA 12 to HDA 10 and to a host system (the host not being shown). For effecting a connection to the host, PCBA 12 includes a connector 52 which interfaces with a matching host connector 522 which couples to a host I/O interface or I/O bus adapter via an I/O cable 520. Suitably, connector 52 is a 40-pin EIDE connector that conforms to certain ANSI interface standards. Alternatively, the host interface connection may be designed to be compatible with any other suitable host interface.

PCBA 12 is suitably affixed to HDA 10 by screws which are received by matching threaded openings in HDA 10. Alternatively, PCBA 12 may be affixed to HDA 10 through adhesive bonding, press snap fitting, or other methods. PCBA 12 is suitably electrically connected to HDA 10 via a connector 540 and a connector 542. Connector 540 connects circuitry in PCBA 12 to preamp 22, coil 23 and spindle motor 16 in the interior of HDA 10. Connector 540 suitably is a plug connector; it may be some other kind of connector such as a zero insertion force (ZIF) flex circuit connector. Connector 542 connects windings of spindle motor 16 to circuitry in PCBA 12. Preferably, the electrical connections between PCBA 12 and HDA 10 are completed when PCBA 12 is affixed to HDA 10 during manufacture of the disk drive. Optionally, HDA 10 and PCBA 12 may be provided separately and integrated by OEMs or end users in which case connection 540 and 542 may be suitable for attaching to a commercially available HDA. The details of a suitable HDA are shown in U.S. Pat. No. 5,270,887, the disclosure of which is incorporated by reference.

HDD BLOCK DIAGRAM

Figure 1D:
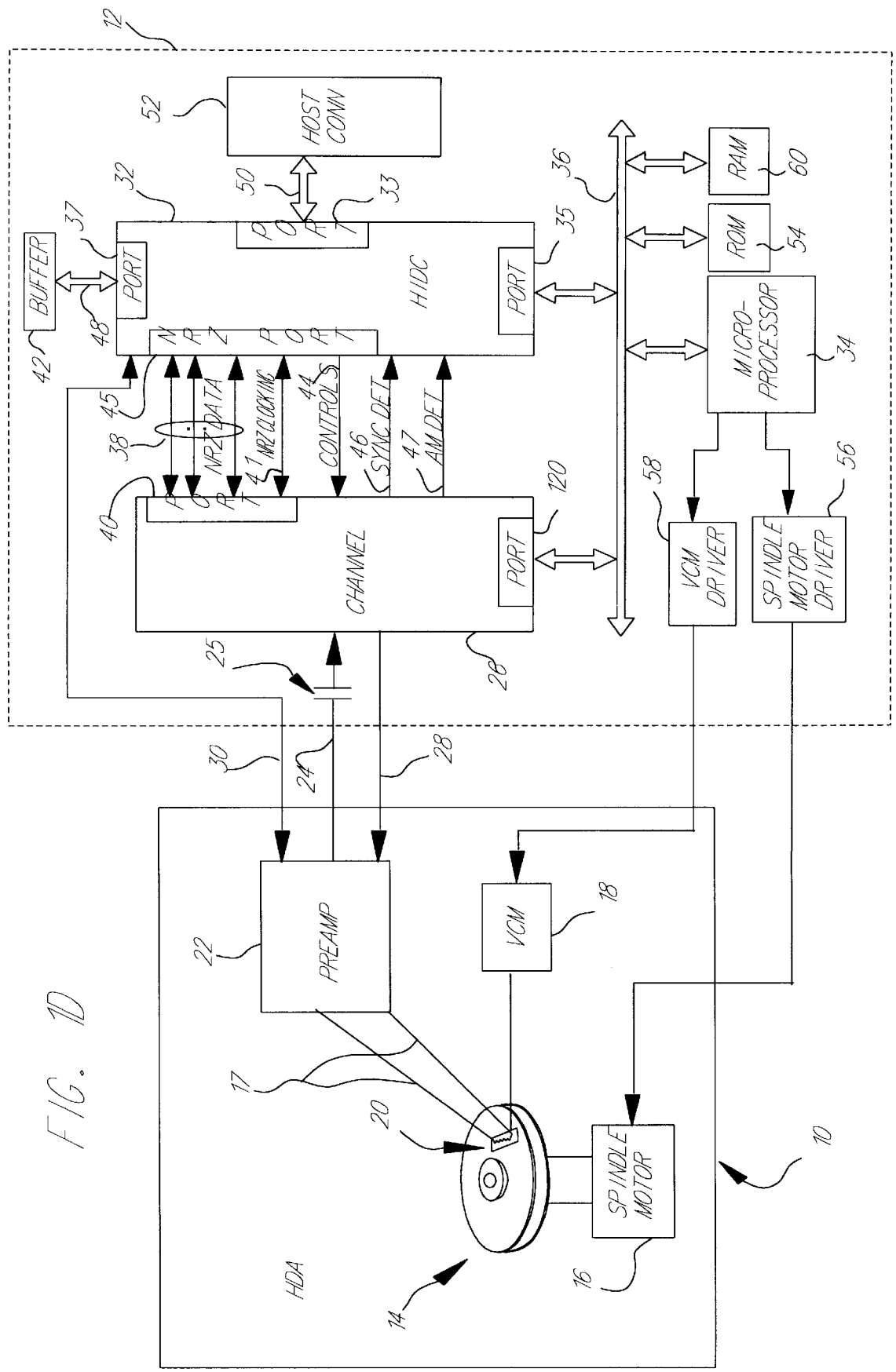
FIG. 1D is an overall functional block diagram of the disk drive of FIG. 1A.

Referring to FIG. 1D, HDA 10 includes two motors, i.e., spindle motor 16 and voice coil motor ("VCM 18"). Spindle motor 16 is mechanically coupled to cause disks 14 to rotate. VCM 18 is implemented by structure shown in FIG. 1A including magnets 21 and portions of HSA 19 such as coil 23.

Suitably, disks 14 provide four recording surfaces. Each of the recording surfaces has a plurality of tracks arranged an embedded servo format. In an embedded servo format including the format employed in a preferred embodiment, there are provided interspersed servo-data regions and user-data regions; each servo-data region includes servo track segments for storing servo data and servo bursts, and each user-data region includes user track segments for storing user data. Each of a suitable number of transducers 20 provides for reading and writing with respect to a respective one of the recording surfaces of disks 14. Alternative embodiments may have more or fewer disks. When reading, each transducer 20 generates a low level analog read signal 17, which for inductive heads and many MR heads is a differential signal. Analog read signal 17 is conveyed to signal inputs of preamp 22. Preamp 22 produces a read signal 24 which is an amplified, differential, analog read signal. HDA 10 also includes a path for conveying read signal 24 to PCBA 12; a path for conveying a write data signal 28 to preamp 22; and a path for conveying preamp control signals 30 for preamp 22. Under control of control signals 30, preamp 22 operates in either a read mode or a write mode and in either case communicates with a selected transducer 20. Suitably, preamp 22 is implemented by a commercially available IC such as the SSI 32R2202 or SSI 32R2203, each of which is manufactured by Silicon Systems Inc., Tustin, Calif.

Suitably, spindle motor 16 is a multi phase, brushless DC motor. The prior art teaches suitable means for controlling spindle motor 16 to spin up to, and down from, a substantially constant angular velocity. VCM 18 is an element of a head-positioning servo system, and applies torque to HSA 19 to swing it during a track-seeking operation and to maintain it at a desired angular position during a track-following operation. During a write operation, preamp 22 provides write current to a selected transducer 20; the write current changes polarity upon each change in binary value of write data signal 28. Read signals 17 and 24 have the same information content, and both are noise-corrupted. During a user-data read operation, each serially defines servo data and user data; the servo data include gross-positioning data including track identification data, and fine-positioning data in the form of analog servo bursts. Thus, a selected transducer 20 and preamplifier 22 constitute a read means operative during a user-data read operation for reading data from the disk surface to produce a time-multiplexed analog read signal that during a revolution of the disk represents servo data during each of one set of time intervals; represents servo bursts during each of another set of time intervals; and represents user data during each of another set of time intervals.

PCBA 12 includes a channel 26 and a host interface and disk controller ("HIDC 32"), each of which preferably is implemented as a single IC. Preferably, these two ICs in combination perform overall functions including basic timing functions that in certain prior art disk drives three ICs had performed. One such basic timing function entails the generation of the "global clock" and the synchronization of the global clock to the servo sample rate. One of the 3 ICs within such prior art disk drives is a servo IC, the other 2 being a channel IC and a disk controller IC, with the servo IC containing circuitry for generating and synchronizing the global clock. The above-mentioned U.S. Pat. No. 5,311,376 to Joan et al., discloses relevant background information about such a disk drive that includes a servo section. In one embodiment of this invention, HIDC 32 contains circuitry for generating the global clock which is synchronized to the servo sample rate by a signal supplied by channel 26. In addition, HIDC 32 contains timing circuitry controlled by the global clock to provide timing signals used in demultiplexing including separating servo data from servo bursts and from user data. Alternatively, channel 26 includes the global clock and timer circuitry.

Irrespective of the allocation of such circuitry between channel 26 and HIDC 32, channel 26 provides, among other things, a signal processing path for processing read signal 24 to produce a clocked, serial-by-symbol data signal (i.e., a decoded binary data signal and accompanying clock signal). In this art, such a signal processing path that processes an analog read signal produced by a preamplifier to produce such a clocked serial-by-symbol data signal is commonly called a "read channel." Channel 26 also provides a signal processing path for processing a clocked serial-by-symbol data signal provided by HIDC 32 to produce a serial-by-bit data signal for the analog signal input of preamp 22. In this art, such an signal processing path is commonly referred to as a "write channel." The serial-by-symbol data signals propagate between channel 26 and HIDC 32 via a channel data bus 38. The clock signals for the serial-by-symbol data signals are shown collectively as NRZ CLOCKING 41 in FIG. 1D.

Some of the important functions performed by the read channel within channel 26 are achieving bit synchronization and framing, i.e., achieving data block synchronization. As for bit synchronization, suitable means for performing this function are taught in the prior art; in particular, a multi-mode timing recovery circuit is commonly employed in read channels. Such a timing recovery circuit generally has a lock to reference mode, an acquisition mode and a tracking mode. During each such mode, the timing recovery circuit produces an oscillating signal which is locked onto the same, or substantially the same, frequency as an oscillating signal it receives as an input. During the lock to reference mode, the oscillating signal input to the timing recovery circuit is the output of a frequency synthesizer. During the acquisition mode and during the tracking mode, the oscillating signal input to the timing recovery circuit is read signal 24. Certain properties of the timing recovery circuit are modified between acquisition mode and tracking mode; these include loop gain and other properties affecting bandwidth and stability.

Channel 26 is coupled to receive read signal 24 through a set of coupling capacitors 25 and has a port 40 connected via bus 38 to an NRZ port 45 in HIDC 32. Ports 40 and 45 and interconnecting bus 38 propagate data in a clocked, serial-by-symbol form referred to herein as non-return-to-zero (NRZ) form. The terms "NRZ" and "NRZI" (Non-Return to Zero Inverted) as used herein have their customary meaning in this art. That is, NRZ refers to a coding system in which a binary 1 is represented (at an instant in time indicated by a clock signal) by a 1 st level or state and a binary 0 is represented (at an instant in time indicated by a clock signal) by a second level or state. NRZI refers to such a clocked coding system in which a binary 1 is represented by a transition from a 1 st level or state to a second level or state and a binary 0 is represented by the absence of a transition.

During a user-data read operation, channel 26 processes read signal 24 to produce, on port 40, a clocked serial-by-symbol data signal that sequentially represents the same servo data and the same user data that the analog read signal represents. Preferably, channel 26 supports use of a partial response, maximum likelihood (PRML) coding system. The term "PRML" as used herein refers to a type of signal processing employing sampled and equalized values of an input signal which are evaluated over several samples to estimate symbols contained in the input signal. PRML is one type of a broader class of signal processing systems referred to as "sampled-data processing systems."

Irrespective of the allocation of the sector timer function between channel 26 and HIDC 32, HIDC 32 performs numerous control functions for the disk drive including host interface functions to manage transfer of data between the disk drive and the host, and certain disk controller functions to manage the operation of channel 26 in writing and reading data. Incident to such certain disk controller functions, HIDC 32 has circuitry for producing certain timing and control signals that are part of a set identified collectively as timing and control signals 44 which are sent between channel 26 and HIDC 32. As part of timing and control signals 44, HIDC 32 sends to channel 26 one of a set of signals collectively identified as write gate signal (WGATE) and one of a set of signals collectively identified as read gate signal (RGATE). In one embodiment, HIDC 32 sends to channel 26 as part of timing and control signals 44 one of a set of signals collectively identified as burst gate signal (BGATE), and one of a set of signal identified as AM ENABLE. In this embodiment, HIDC 32 includes sector timer circuits, and channel 26 sends a SYNC DET signal 46 and an AM DET signal 47 to HIDC 32 to synchronize the sector timer circuits. In an alternative embodiment, channel 26 includes sector timer circuits synchronized by SYNC DET signal 46 and AM DET signal 47, obviating the need to send these signals to HIDC 32. In the alternative embodiment, channel 26 internally produces BGATE and AM ENABLE, obviating the need for HIDC 32 to send a BGATE signal or an AM ENABLE signal to channel 26. In some systems, the "SYNC DET" signal is a particular data word conveyed via NRZ bus 38 rather than a binary-valued signal carried by a single line. These two implementations are functionally equivalent. In each case, the signal informs HIDC 32 that channel 26 has detected the sync word.

PCBA 12 also includes a data buffer 42, a microprocessor 34, a read only memory ("ROM 54"), a writeable random access memory ("RAM 60"), a VCM driver 58 for supplying current to VCM 18, and a spindle motor driver 56 for supplying current to spindle motor 16. PCBA 12 also includes a host interface bus 50 for conveying commands and data between HIDC 32 and the host, a microprocessor bus 36, a buffer bus 48 for conveying data between HIDC 32 and data buffer 42, and a path for conveying control signals 30 that provide for bi-directional control interactions between preamp 22 and HIDC 32.

Suitably, microprocessor 34 is a commercially available microprocessor or microcontroller, such as Model No. 80C196NP2 available from Intel Corporation. Microprocessor 34 executes instructions acquired from a stored control program to control disk drive functions. These functions include reading and decoding host commands, starting up and controlling the speed of spindle motor 16, minimizing head-positioning servo off track error through control of VCM 18, managing reduced power modes of operation, and other disk drive functions. Microprocessor 34 includes an I/O port that is connected to microprocessor bus 36.

Microprocessor 34 suitably includes an embedded ROM that stores some of the control programs it uses. Here, control programs include the instructions microprocessor 34 executes, and tables, parameters or arguments used during the execution of these programs. Microprocessor control programs may also reside in any or all of ROM 54, RAM 60, or data buffer 42. Microprocessor 34 may also include a register set and may also include a writeable random access memory (RAM).

Microprocessor 34 suitably has separate ports for directly communicating with spindle motor driver 56 and VCM driver 58. Channel 26 has a port 120 and HIDC 32 has a port 35 that connect to microprocessor bus 36, whereby microprocessor 34 is capable of communicating directly with either IC via microprocessor bus 36. Microprocessor bus 36 also enables microprocessor 34 to communicate directly with ROM 54, and RAM 60. In alternate embodiments, spindle motor driver 56 and VCM driver 58 may be connected to a single port or to microprocessor bus 36.

Channel data bus 38 includes an 8-bit wide (byte-wide) parallel path; alternate embodiments may employ more or fewer parallel bits for channel data bus 38. Depending upon applicable data transfer requirements, a 4-bit wide (nibble-wide) path or even a serial-by-bit path may be suitable for channel data bus 38.

Providing channel 26 with connections to both microprocessor bus 36 and channel data bus 38 enables microprocessor 34 and channel 26 to communicate via microprocessor bus 36 without interfering with high speed read/write data exchange between channel 26 and HIDC 32 via channel data bus 38.

Preferably, channel 26 includes circuitry to accept write data from HIDC 32 via channel data bus 38 and port 40, to encode write data, and to produce write data signal 28 which is conveyed via preamp 22 to selected transducer 20. Preferably, channel 26 encodes write data in accordance with Run Length Limited (RLL) code constraints. The term "RLL" as used herein has its customary meaning in this art. That is, RLL refers to a type of coding which restricts the minimum and maximum number of binary zeros between binary ones.

Channel 26 also includes circuitry to process read signal 24, and, on a time-multiplexed basis, generate decoded digital user data, decoded digital servo data, and a digital representation of demodulated servo burst data. The decoded digital servo data and decoded digital user data are conveyed to HIDC 32 via port 40, channel data bus 38, and HIDC NRZ port 45. Microprocessor 34 acquires the demodulated servo burst data via microprocessor port 120 and microprocessor bus 36, and uses these data to perform fine-position head-positioning servo operations. An alternative embodiment may incorporate servo control circuitry in a servo IC in which case the demodulated servo burst data would be provided to such IC.

In addition to HIDC NRZ port 45, HIDC 32 includes a buffer port 37 connected to buffer bus 48, and host interface port 33 connected to host-interface bus 50. HIDC 32 includes a buffer manager-arbitrator circuit that manages access to data buffer 42 and manages bi-directional exchange of data between HIDC 32 and data buffer 42 via buffer bus 48. Host interface port 33 provides for communicating with the host via host interface bus 50 and host connection 52. Suitably, host interface port 33 includes a set of ATA compatible host interface task file registers implemented as taught in the prior art. Both microprocessor 34 and other circuitry within HIDC 32 can read task file register contents. This preferred host interface port 33 also includes a set of host command registers and host data registers for parallel transfer of commands and data via host interface bus 50.

HIDC 32 also controls disk formatting and address translation. The translating of addresses includes translating a logical block address to a cylinder/head/sector address and provides for defect management. HIDC 32 also includes error detection and correction (EDAC) circuitry that is used to correct errors in user data that were read from disks 14 and stored in data buffer 42.

Data buffer 42 is implemented as random access memory such as a dynamic random access memory (DRAM) or a static random access memory (SRAM). Preferably, data buffer is implemented by at least one DRAM or SRAM IC that is affixed to PCB 31. In alternate embodiments, data buffer 42 and buffer bus 48 may be incorporated into HIDC 32. Data buffer 42 stores data recovered from a disk 14, data provided by the host that are to be recorded on a disk 14, and, optionally, disk drive commands, servo data and control programs for microprocessor 34. The buffer manager within HIDC 32 arbitrates access to data buffer 42 when contention for access to data buffer 42 occurs as consequence of various concurrent operations. Disk drive commands received from the host may be stored in data buffer 42 and be subsequently retrieved by microprocessor 34. Data buffer 42 preferably has sufficient capacity to hold multiple sectors of user data for both read and write operations; a suitable capacity is at least 64 KB and may be 512 KB or more where KB=1024 bytes.

ROM 54 is an optional conventional IC that stores at least part of the control program used by microprocessor 34. ROM 54 may be omitted in an embodiment in which microprocessor 34 includes embedded ROM suitable for replacing the functions of ROM 54.

RAM 60 is an optional, conventional RAM IC used to enlarge the high speed writeable memory available to microprocessor 34. RAM 60 is included in PCBA 12 when microprocessor 34 lacks sufficient internal RAM, and data buffer 42 cannot provide microprocessor 34 sufficient external storage or sufficiently fast external storage.

The host may be any electronic device that has an input/output (I/O) bus and interface connection means that is compatible with host connection 52, host interface bus 50 and host interface port 33. For example, the host may be a personal computer that includes an AT bus which has become a de facto standard for IBM PC compatible computer systems and is referred to as the Industry Standard Architecture (ISA). A higher speed Enhanced AT bus has also been introduced. Various attachments to the AT bus have also become common for allowing peripherals, including disk drives, to more efficiently couple to the AT bus. For example, the Integrated Drive Electronics (IDE) attachment to the AT bus has become a very common interface for attaching disk drives to the standardized AT bus and is commonly referred to as the ATA (for AT bus Attachment) standard. Similarly, an interface standard referred to as Enhanced IDE (EIDE) is used to couple disk drives in the host. Preferably, the disk drive is adapted to attach to the host I/O bus via an EIDE connector. Alternatively, connection 52 may be implemented for connecting directly to a host I/O bus.

Alternative disk drive embodiments may conform to other interface specifications and appropriate other connections may be employed. Such alternate interfaces include the Small Computer Standard Interface (SCSI), the Serial SCSI Architecture (SSA) interface, the P1394 interface, the Fiber-channel interface, and the parallel printer port interface. Each of numerous embodiments of a disk drive in accordance with the present invention can be compatible with at least one of the above-noted alternate interfaces, or other suitable interfaces, used by the host.

EMBEDDED-SERVO

Figure 2A:
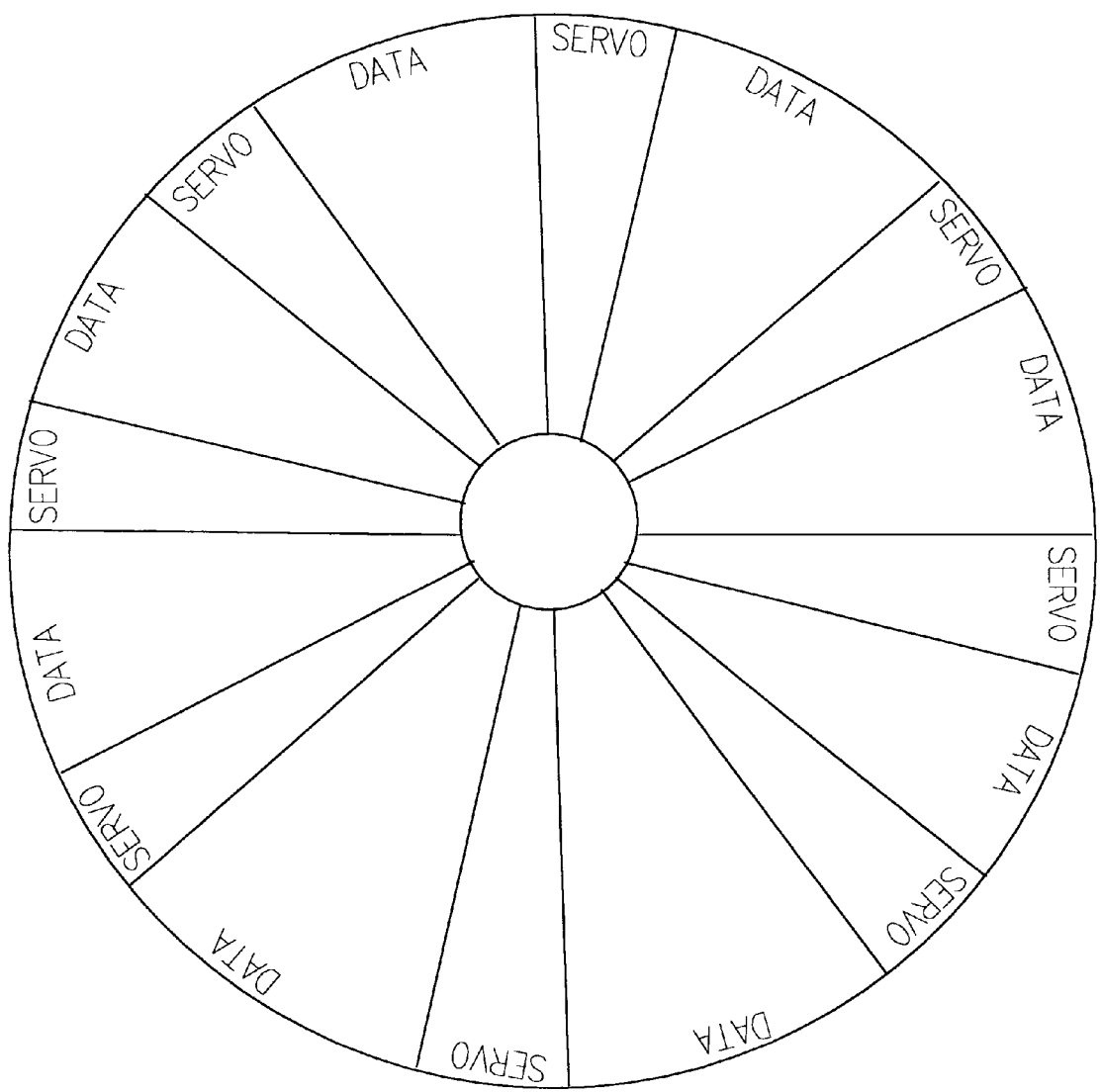
FIG. 2A is a drawing of a disk surface having a plurality of tracks arranged in a prior art embedded servo format.
Figure 2B:
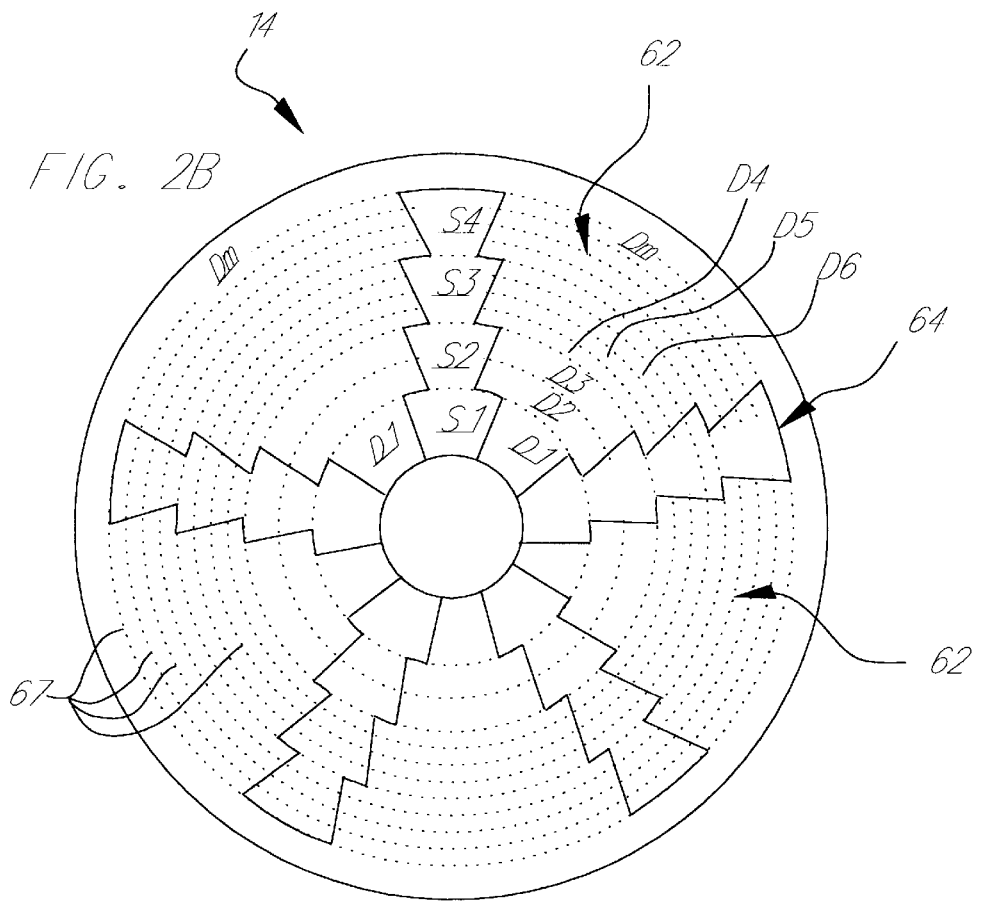
FIG. 2B is a drawing of a disk surface having a plurality of tracks arranged in an embedded servo format in accordance with a preferred embodiment of the invention.

Referring to FIG. 2B, each disk 14 preferably has two data-storage surfaces. Each of these surfaces has a plurality of concentric tracks arranged in an embedded servo format including a plurality of radially-extending user-data regions 62 and a plurality of radially-extending servo-data regions 64. Servo-data regions 64 are written by a servo writer under controlled conditions. In FIG. 2B, the angular size of each servo-data region 64 is greatly exaggerated, and only five such regions are shown. The number of servo-data regions required depends on various factors; typically they number between 60 and 100 with a number as low as 10 and as high as 150, or more, also being suitable. The term "user data" refers to information recovered from or to be written into user-data regions 62, and the term "servo data" refers to information recovered from servo-data regions 64.

Features of this format that have significant advantages include use of the data zone bands and servo zone bands described below for user-data regions 62 and servo-data regions 64, respectively.

Each user-data region 62 preferably has M concentric data zone bands $D_i$ where i =1, 2, . . . M, where M is a positive integer, and each servo-data region 64 preferably has N concentric servo zone bands $S_i$ where i =1, 2, . . . , N, and where N is a positive integer. The radial terminus (or arc-shaped boundary) of each data zone band, $D_i$, is a data zone boundary 67, and the radial terminus (or arc-shaped boundary) of each servo zone band, $S_i$, is a servo zone boundary 63. Each data zone band, $D_i$, includes a plurality of data track segments 90 (FIG. 3B) each of which has data recorded therein at a single channel frequency, with the channel frequency varying from data zone band to data zone band. Likewise, each servo zone band, $S_i$, includes a plurality of servo track segments 68 (FIG. 3A) each of which has servo data recorded therein at a single channel frequency with channel frequency varying from servo zone band to servo zone band. As used herein, the terms "data track segment" and "servo track segment" refer to the elements that make up a complete track; each data track segment 90 is located between consecutive servo-data track segments 68. The term "channel frequency" as used herein has its customary meaning in this art. That is, the channel frequency is the reciprocal of a time period "T," where the "T" is the time period consumed while an elemental-length magnet passes under the transducer during a read operation with the disk spinning at a constant angular velocity. In this regard, the length of each magnet recorded along a track as a result of a write operation is, to a first order of approximation, either an elemental length or an integer multiple of the elemental length.

Channel 26 operates at the same channel frequency during read operations for every data track segment 90 in the same data zone band; similarly, channel 26 operates at the same channel frequency during read operations for every servo track segment 68 in the same servo zone band.

Varying the channel frequency from zone band to zone band (whether for user data or servo data or both) has an advantage in that it promotes maximizing bit density within tolerated error constraints. Selection of channel frequency is determined by the linear track length, transducer flying height, media quality (e.g., disk surface smoothness, quality of the magnetic coating material, etc.) and constraints imposed by channel 26. Typically, the channel frequency will increase in an outward radial direction. For data zone bands, the channel frequency of innermost zone band $D_1$ is less than the channel frequency of zone band $D_2$, which is less than the channel frequency of zone band $D_3$. . . which is less than the channel frequency of outermost zone band $D_M$. For servo zone bands, the channel frequency of innermost zone band $S_1$, is less than the channel frequency of zone band $S_2$, which is less than the channel frequency of zone band $S_3$. . . which is less than the channel frequency of outermost zone band $S_N$. This increase in channel frequency from zone band to zone band (whether for user data or servo data or both) allows linear bit density to be maintained at or near an optimal level while moving from inner to outer tracks.

Servo zone bands $S_1$–$S_N$ preferably share the same zone boundaries as data zone bands $D_1$–$D_M$, as shown in FIG. 2B, but need not do so in alternative embodiments. Preferably, fewer servo zone bands than data zone bands are defined in the format, as shown in FIG. 2B. A suitable number of data zone bands is as low as 2 and as high as 20, or more. In a preferred embodiment, 4 servo zone bands and 16 data zone bands (i.e. N=4, M=16) are defined however, the number of zone bands used will vary with the specific disk drive implementation. Although FIG. 2B illustrates a format having more data zone bands than servo zone bands, alternatively, the number of servo zone bands N may be greater than the number of data zone bands M. Preferably, at least two servo zone bands and at least three data zone bands are provided. The upper limit to the number of zone bands is only limited by the number of tracks on a disk surface. Preferably, however, a guard band consisting of one or more unused data tracks is provided between servo zone bands to avoid intertrack interference. Typically, the guard bands will include at least two tracks, one guard track for each zone band, with the guard track containing valid servo data consistent with the zone band that it guards. The use of guard bands limits the number of servo zone bands to be substantially less than the total number of tracks on the disk surface.

In operation of any embodiment in which the servo zone bands and data zone bands are not in one-to-one correspondence, there will be zone bands in which a servo track segment 68 and immediately following data track segment 90 have different channel frequencies. While processing read signal 24 during a user-data read operation, channel 26 needs to switch from one channel frequency to another and back again in a repeating fashion as user-data regions and servo-data regions pass under selected transducer 20. Such frequencies may be substantially different, e.g. differing from 10% to 100%. To reliably detect data from a read signal varying between these different channel frequencies, a suitable signal-processing means is necessary. Preferably, channel 26 incorporates a read channel 200 (FIG. 4) that provides such a means for processing a read signal that alternately defines servo data at a servo channel frequency and user data at a data channel frequency. However, other more costly read channel implementations may also provide such means. For example, such a read channel may include duplicated signal paths for user data processing and servo-data processing.

For both servo zone bands and data zone bands, the zone to zone frequency change need not be the same from zone band to zone band, and the number of tracks within a zone band may change from zone band to zone band. For example, fewer tracks may be provided in the outer zone bands than the inner zone bands.

Figure 2C:
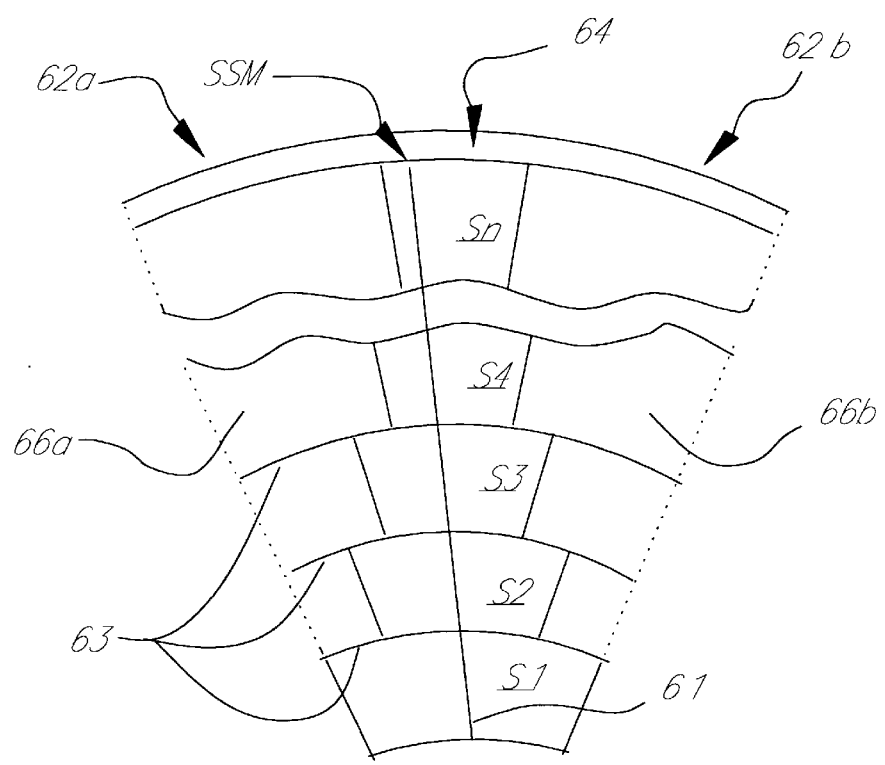
FIG. 2C is an enlarged view of a fragment of the disk surface of FIG. 2B.

An advantage of zoned servo-data regions 64, when compared with a constant frequency servo wedge approach, is that using higher linear bit densities in the outer zone bands enable the allocation of less disk area to the servo-data regions. In the prior art arrangement of FIG. 2A, a constant frequency servo wedge approach employs servo wedges that are significantly wider at the outermost part of the disk surface than they are at the innermost part of the disk surface. As shown in FIG. 2B and in FIG. 2C, for zoned servo, each servo-data region 64 has a step wise decreasing angular shape as zone bands at larger disk radii are considered. In FIG. 2C, a pair of dashed lines defining a simple wedge shape indicates the area which would be occupied by a servo-data region in the case of a constant frequency servo wedge approach. As FIG. 2C indicates, the use of zoned servo reduces the disk area consumed by servo data, and thereby increases the available disk surface area for user-data regions 62a and 62b on opposite sides of a given servo-data region 64. This additional surface space available for data storage is shown as region-a 66a and region-b 66b in FIG. 2C.

The reduction in surface area occupied by servo-data regions 64 makes more feasible use of a larger number servo-data regions 64 (e.g. up to 150 or more). Increasing the number of servo-data regions 64 facilitates use of higher servo sample rates which in turn permits use of higher track densities. Alternatively, if the number of servo-data regions 64 is maintained constant (i.e., relative to a non-zoned servo approach), the zoned servo approach increases the disk area available for storing user data, as shown in FIG. 2C. In either case, use of zoned servo enables increasing the user-data storage capacity realized from disk 14. This increase in efficiency is offset to a small degree by the need to use one or more guard band tracks at each servo zone boundary 63.

Every servo track segment 68 has a servo sector sync mark ("SSM 76"). SSM 76 is a track-independent data string defining a predetermined servo-sync mark. Every SSM 76 within a given servo-data region 64 is arranged in alignment with an alignment radius 61 (FIG. 2C). Each servo-data region 64 has its own alignment radius 61. Preferably, in accordance with another invention made by the assignee hereof, the end of each SSM 76 is aligned with alignment radius 61. Alternate embodiments may align some other servo-data field with alignment radius 61. Detection of SSM 76 causes channel 26 to issue SYNC DET 46 to HIDC 32 which precisely establishes a timing reference point for any read/write operations that occur until the next SSM 76 arrives. After being synchronized with one SSM 76 arrival time, timers in HIDC 32 predict subsequent SSM 76 arrival times.

Preferably, the angular separation between adjacent alignment radii 61 is the same for all alignment radii 61, and the time interval between SSM 76 is the same for all SSM 76 on a single disk surface and does not change during track-seeking operations that traverse a servo zone boundary 63 (FIG. 2C), and, consequently, servo timing need not be adjusted during track-seeking operations. If any servo field element other than SSM 76 were to be aligned with alignment radius 61, the SSM field would not be aligned from zone band to zone band and, it would not be possible to maintain constant servo sector SYNC DET timing during track-seeking operations that cross zone boundaries.

FIELDS IN TRACK SEGMENTS
Servo Track Segments

Figure 3A:
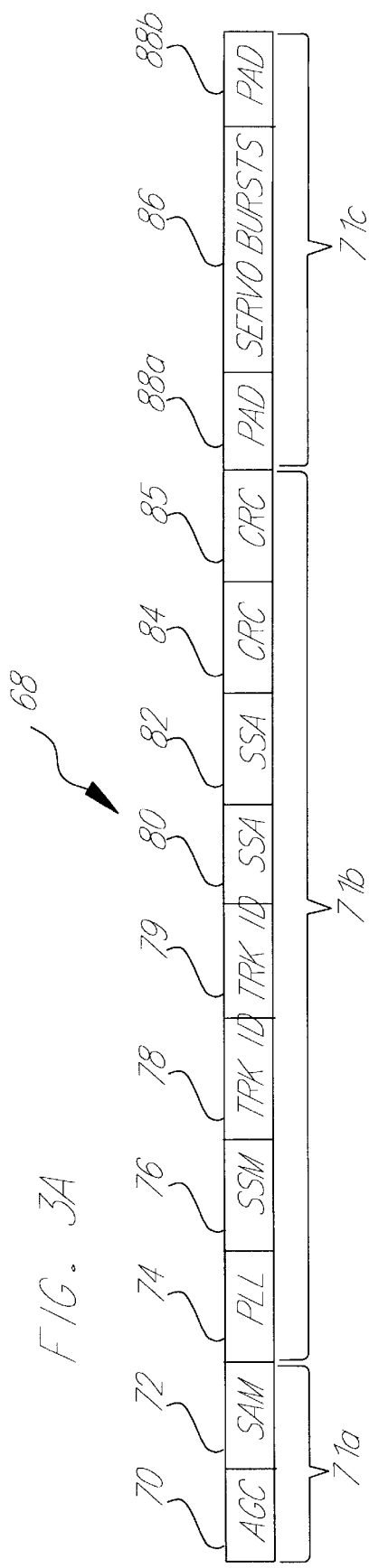
FIG. 3A is a diagram of a servo track segment having a format in accordance with a preferred embodiment of the invention.

Referring to FIG. 3A, a complete servo track segment 68 in a servo-data region 64 includes the fields shown diagrammatically in a straight line. Preferably, all servo-data track segments 68 are similar and each includes the fields shown in FIG. 3A. Herein, the term "field" is used to refer to a track space allocation that contains recorded information called an "element" or "record." Preferably, servo track segment 68 provides fields for storing the following elements, in sequence, an automatic gain control bit stream ("AGC 70"), a servo address mark ("SAM 72"), a preamble or phase lock loop bit stream ("PLL 74"), SSM 76, a cylinder address referred to herein as TRK ID 78, a redundant TRK ID 79, a servo sector address ("SSA 80") that includes a servo sector number and head number, a redundant servo sector address ("redundant SSA 82") that also includes a servo sector number and head number, a cyclical redundancy check code ("CRC 84"), a redundant CRC 85, PADA 88 a, servo bursts 86 (e.g. 2–6 bursts) used primarily for track following servo operations, and PADB 88b. Some of the fields and elements are optional and may be omitted in a given disk drive design.

The fields and elements making up each servo track segment 68 are divided into groups according to how they are processed by channel 26. SAM group 7 1a includes AGC 70 and SAM 72 fields and elements; servo ID group 71b includes PLL 74, SSM 76, TRK ID 78, redundant TRK ID 79, SSA 80, redundant SSA 82, CRC 84 and redundant CRC 85; and servo bursts group 71c includes servo bursts 86 and PAD 88.

The SAM group 71 a enables channel 26 to locate the beginning of a servo track segment 68 when servo sector timers cannot be used to do so. AGC 70 is a constant-frequency bit stream that has sufficient length to enable an automatic gain control (AGC) circuit in channel 26 to establish a desired signal level within channel 26 before SAM 72 passes under the selected transducer 20. The use of AGC amplifiers facilitates reducing the read error rate of channel 26 while recovering data and consequently reduces the SAM 72 misdetection rate. Using AGC increases the signal to noise ratio in channel 26 while processing any track element and improves channel 26 performance in other ways.

SAM 72 is used during a disk drive calibration procedure that synchronizes servo sector timers with the time that SSM 76 arrives at the selected transducer 20. The servo sector timers are subsequently used to predict the arrival of other track elements and to initiate the associated processing of these elements. SSM 76 arrival times may vary because of variations in the speed of rotation of disks 14. The calibration process reads the information recorded on the disk surface and searches for a SAM 72; upon detecting a SAM 72, channel 26 issues AM DET 47 to indicate the arrival of a PLL 74 and the imminent arrival of the associated SSM 76. The subsequent arrival and detection of SSM 76 causes channel 26 to issue SYNC DET 46; SYNC DET 46 serves as a timing reference and synchronizes servo sector timers.

The preferred SAM 72 codes violate the RLL code constraints employed during recording of all other servo and user data. A primary consideration in the selection of a preferred SAM 72 bit pattern is that it be easily distinguished from all other information recorded on the disk surface.

The information recorded in servo ID group 71b for each servo track segment 68 is unique, and when read identifies the particular disk surface, servo-data region 64, and track that is being processed. Channel 26 processes the information defined in serial-by-bit form by servo ID group 71b, converts it to NRZ data and sends the NRZ data to HIDC 32 via channel data bus 38. Microprocessor 34 acquires these data by reading registers contained in HIDC 32. HIDC 32 and microprocessor 34 use the servo data to confirm the identity of transducer 20 and disk surface being read, and to determine the radial and angular position of selected transducer 20 over the selected disk surface.

PLL 74 is a sequence of bits recorded at a constant frequency, and has a sufficient number of consecutive flux reversals to enable circuitry in channel 26 to achieve phase synchronization with PLL 74 before SSM 76 arrives at the selected transducer 20. Suitable means for achieving this bit synchronization are taught in the prior art.

Channel 26 also uses SSM 76 to locate the first bit in TRK ID 78, servo-data framing, as further discussed below. Suitably, SSM 76 conforms to the same RLL code constraints used to encode user data. However, SSM codes are selected to be robust in the sense that they facilitate the design of detection logic that is able to precisely locate SSM 76 despite the channel having read one or more code bits of SSM 76 in error. Robust codes are further discussed below.

TRK ID 78 has the same bit pattern for all servo-data track segments 68 in a given track, and has a different bit pattern for every track on the same disk surface. Thus, TRK ID 78 is a track-dependent data string for uniquely identifying the track involved in a read operation. The preferred servo track segment 68 also includes an optional redundant TRK ID 79.

Preferably, both TRK ID 78 and redundant TRK ID 79 are Gray coded bit patterns, and are phase coherent. The term "Gray code" as used herein has its customary meaning in this art. That is, a Gray-coded track-identifying string is such that only one logical bit of the string changes from a track to either adjacent track.

As for TRK ID 78 and redundant TRK ID 79 being phase coherent, this relates to the phases of flux reversals of TRK ID patterns written in radially adjacent tracks. Preferably, phase coherency is achieved through use of tri-bit encoding. With tri-bit encoding, each logical bit such as a logical bit of a Gray-coded track ID is represented by a codeword having three code bits, with each code bit being represented by the presence of a flux reversal (of either polarity; i.e., either a positive-polarity flux reversal ["+"] or a negative-polarity flux reversal ["−"])or by the absence of a flux reversal ["0"]. In a representative tri-bit code, a logical 1 can be represented by either "+ − +" or "− + −," and a logical 0 can be represented by either "+0 0" or "−0 0." As used in this context, phase coherency means that the first flux reversals in adjacent codewords on adjacent tracks have the same polarity.

Phase coherency may not be maintained at servo zone boundaries 63 (FIG. 2C). The optional redundant TRK ID 79, when present, improves track detection reliability and reduces the probability that track ID errors will occur during track-seeking operations; this advantage is particularly significant when very high bit densities are used to record servo track segment 68 in disk drives that use high speed track-seeking operations.

SSA 80 and redundant SSA 82 are codes that are unique in each servo-data region 64 in the disk drive, i.e., these codes are defined so that they may be used to uniquely identify the transducer 20 and disk surface being used (assuming more than one disk surface containing data are provided) and the specific servo-data region 64 that is passing under the transducer 20. These codes may be implemented in any of a variety of ways; for example, they may be implemented as a single value that is different for each servo-data region 64 in the disk drive, as a unique value for each servo track segment 68 in the disk drive or, preferably, as a pair of values that separately identify which transducer 20 and disk surface is being used and which servo-data region 64 on a disk surface is under the selected transducer 20.

SSA 80 and optional redundant SSA 82 are preferably provided to facilitate headerless data sector formats; i.e., where the header information conventionally provided in front of each data sector is omitted and the necessary information for locating data sectors is acquired instead from servo track segment 68. Eliminating data sector ID fields and using servo embedded information to locate user-data sectors enables making more of the disk surface available for recording user data.

Servo track segment 68 preferably includes a cyclical redundancy check code ("CRC 84") and an optional redundant CRC 85 which provides error detection for the servo data recorded in servo track segment 68. CRC 84 preferably provides read error checking for TRK ID 78 and SSA 80 while redundant CRC field 85 preferably provides read error detection for redundant TRK ID 79 and SSA 82.

PADA 88 a serves to isolate servo bursts 86 from CRC 84 or redundant CRC 85 and thereby reduces intersymbol interference. In addition, PADA 88 provides time margin for changing the read mode of channel 26 at the end of servo ID group 71b.

Servo burst 71c group participates in the operation of the head-positioning servo system to maintain the selected transducer 20 at or near a hypothetical disk track centerline during track-following operations. Preferably, bursts 88 consist of a sequence of some 2 to 8 short bursts that are radially displaced about the track centerline in a conventional manner to the end that playback signal amplitude for each short burst depends upon the radial position of the selected transducer 20 relative to the short burst that is being processed. Servo track segment 68 also includes a PADB 88b which serves to isolate servo bursts 86 from recorded information that follows bursts 88. PADB 88b also provides time margin for changing the read mode of channel 26 at the end of servo burst 88.

SSA 80 and 82 and CRC 84 and 85 need not be Gray coded or be written in a phase coherent manner since such data are not employed during track-seeking operations. In such cases, the transition from TRK ID 78 or 79 to SSA 80 may be separated by an intervening gap (not shown) included to reduce intersymbol interference between the adjacent phase coherent field (78 or 79) and phase incoherent field 80.

Data Track Segments

Figure 3B:
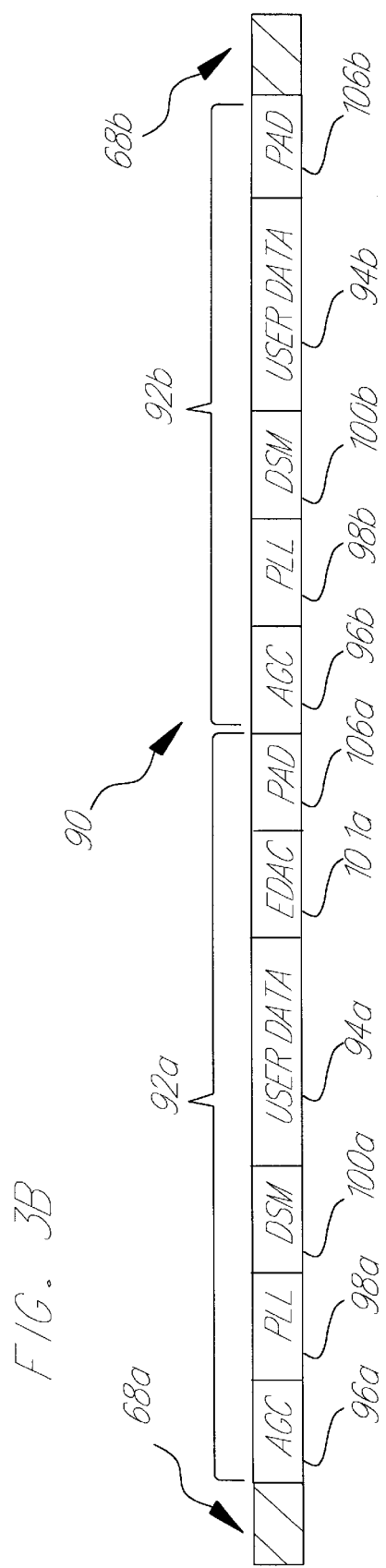
FIG. 3B is a diagram of a data track segment having a format in accordance with a preferred embodiment of the invention.

Referring to FIG. 3B, a data track segment 90 in a user-data region 62 includes the fields shown diagrammatically in a straight line. Each data track segment 90 is made up of at least one and as many as 10 or more data sectors 92, begins at the end of a servo track segment 68 (shown as 68a in FIG. 3B), and ends at the beginning of the next servo track segment 68 (shown as 68b in FIG. 3B). The representative data track segment 90 shown in FIG. 3B includes two data sectors 92a and 92b. Preferably, each data sector has the same format as one of the data sectors 92a or 92b. One or more of the data sectors 92 in a given data track segment 90 may be partial data sectors or split data sectors as further discussed below.

Each data sector 92 may start with an AGC bit stream such as AGC 96 a in data sector 92a and AGC 96b in data sector 92b. Each data sector 92 may include an Error Detection And Correction code such as EDAC 101a in sector 92a. Each data sector 92 preferably has fields storing the following elements: a data PLL bit stream ("PLL 98a" in sector 92a, "PLL 92b" in sector 92b), a data sync mark ("DSM 100a" in sector 92a, DSM "100b" in sector 92b), user-data record ("USER DATA 94a" in sector 92a, "USER DATA 94 b in sector 92b), and a data pad (PAD 106a in sector 92a, "PAD 106b" in sector 92b). Alternate embodiments may include additional fields. As illustrated by data sector 92b, FIG. 3B, an EDAC 101 need not be included in all data sectors 92.

AGC 96 and PLL 98 play the same roles for a data sector that AGC 70 and PLL 74 do for a servo segment. That is, AGC 96 is a constant-frequency bit stream having sufficient length to enable an AGC circuit in channel 26 to establish a desired signal level within channel 26 before DSM 100 arrives at the selected transducer 20. PLL 98 is a sequence of bits recorded at a constant frequency which has a sufficient number of consecutive flux reversals to enable timing circuitry in channel 26 to achieve phase synchronization before DSM 100 arrives at the transducer 20.

Although shown as separate fields to facilitate discussion, AGC 96 and PLL 98 may be considered to be a single field that provides for overlapped AGC operation and timing circuit phase alignment.

Figure 5:
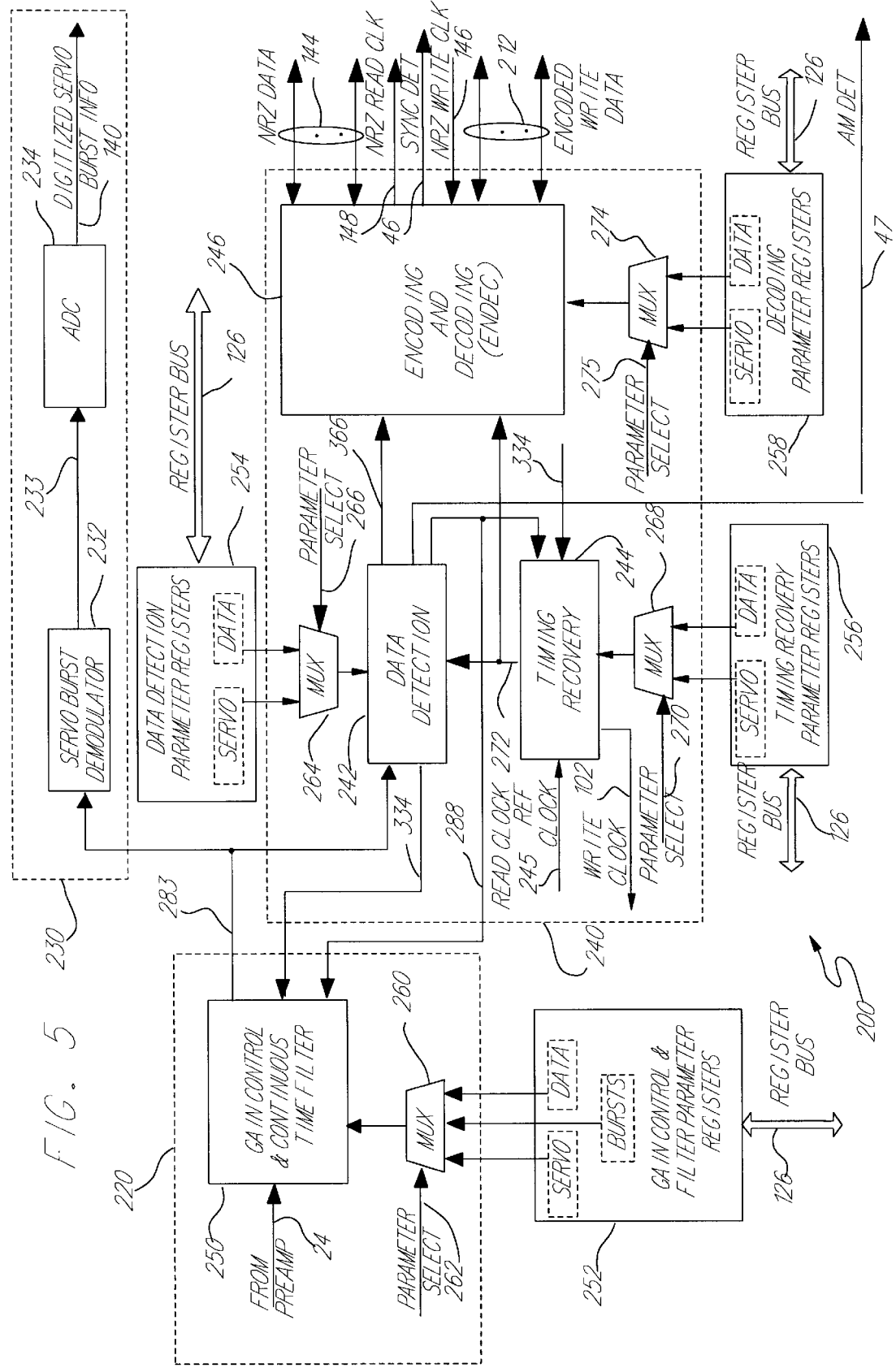
FIG. 5 is a block diagram of a suitable implementation of read channel 200 including associated register set 122 of FIG. 4.

Each DSM 100 participates in framing user data within channel 26 to locate the first bit in its user-data record 94 and to establish byte boundaries for an ENcoding And DECoding circuit ("ENDEC circuit 246" shown in FIG. 5). A primary consideration in selecting a bit pattern for DSM 100 is that it be robust in the sense that it can be recovered (identified) despite the presence of noise in the playback signal that causes one or more bits in DSM 100 to be read incorrectly. Preferably, DSM 100 and SSM 76 (FIG. 3A) are different robust codes.

Most user-data records 94 store a fixed sized quantity of data called a "logical sector" or "logical block" as supplied to the disk drive via host interface bus 50 (FIG. 1D). Typical logical block sizes are 512, 1024 or 2048 bytes with 512 bytes being the preferred length for most hard disk drives.

The amplitude of read signal 17 (FIG. 1D) is affected by the frequency content of the information being read and how well transducer 20 is registered over data sector 92 being read. Successive data sectors 92 in the same data track segment 90 may be written at different times while the disk drive is subjected to different operating environments with the result that successive data sectors 92 are written at slightly different radial positions. In addition, data stored in successive records may be different with the result that the frequency content of the playback signals is different. Accordingly, all data sectors 92 include PLL 98.

Ideally, every data sector 92 has the same fixed size user-data record 94 length that equals the preferred logical block length, e.g., 512 bytes. However, design optimization of a given disk drive that employs both embedded zoned servo and zoned data recording usually forces a compromise between the physical length of a data track segment 90 and user-data record 94 length in one or more data zone bands. The compromise is forced by a need to provide adequate disk surface resources to the head-positioning servo system while allowing user data to be recorded at the maximum linear bit density and thereby to realize the maximum storage capacity for the disk drive. The preferred method for making this compromise is to split a complete logical block into two parts and store the two parts in successive user-data records 92, a logical pair of split data sectors 92. A split user-data record 94 may have any length that is less than the length of a logical block provided that a logical pair of split data records 92 store a complete logical block. Split user-data record 94 length is selected to permit recording the entire data track segment 90 at the highest linear recording density usable in the data zone band. Although a given track may use any number of split user-data record 94 lengths, in preferred implementations, two split user-data record 94 lengths are chosen for use in all split data sectors in a given data zone band.

A split data record 92b that contains the first part of a split logical block may terminate at the beginning of a servo track segment 68b in which case, the first user-data record following the servo track segment 68b will be a split data sector 92 that contains the second part of the split logical block. The split data sectors are said to swallow the servo track segment 68b. Similarly, split data sectors may be used to swallow media defects.

EDAC 101 is used by disk drive error detection and correction means to correct errors in user data recovered from user-data records 94 while the user data are stored in data buffer 42. Error detection and correction means are provided jointly by EDAC circuitry in HIDC 32 and by microprocessor 34.

As illustrated by data sector 92b in FIG. 3B, an EDAC 101 is not included in a split data sector 92 that is the first split data sector 92 in a logical pair of split data sectors 92a nd is included in a split data sector 92 that is the second split data sector 92 in a logical pair of split data sectors 92.

PAD 106 serves as a time buffer between successive data sectors 92. PAD 106 prevents disk speed variations from causing accidental overwriting of the front part or back part of preceding or following servo track segment 68 or data sector 92 and it provides a timing pad during which channel 26 logic operations and mode changes occur.

CHANNEL 26

Figure 4:
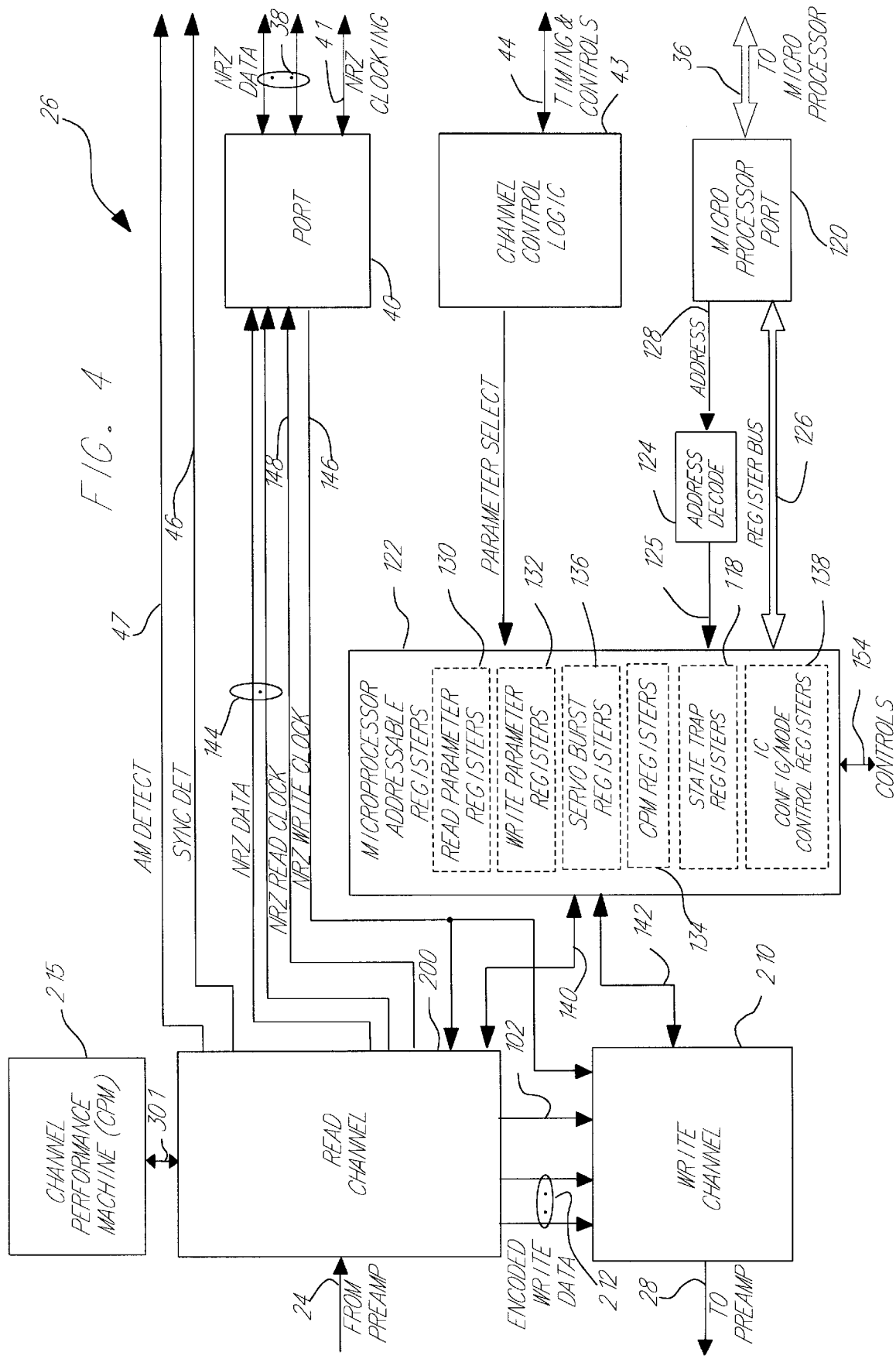
FIG. 4 is a block diagram of a suitable implementation of channel 26 of FIG. 1D.

Referring to FIG. 4, channel 26 includes circuitry that implements: read channel 200, a write channel 210, a microprocessor addressable register set 122, port 40, microprocessor port 120, an address decoder 124 for selecting registers within register set 122 in response to addresses applied to microprocessor port 120 via the bidirectional microprocessor bus 36, a channel performance machine ("CPM 215"), and a set of circuits collectively identified as channel control logic 43.

The structure and function of CPM 215 are relevant to another invention made by the assignee hereof, and the details thereof are not relevant to an understanding of this invention.

Channel 26 also preferably includes bus means for bidirectional transfers of parallel-by-bit signals. The bus means include: a register bus 126 between microprocessor port 120 and register set 122; an input/output (I/O) circuit 140 between read channel 200 and register set 122; an I/O circuit 142 between write channel 210 and register set 122; and an internal NRZ data bus 144 between read channel 200 and port 40. Channel 26 also preferably produces a NRZ read clock 148 conveyed from read channel 200 to port 40; produces encoded write data conveyed by a channel write data bus 212 from read channel 200 to write channel 210.

Register set 122 includes a set of state trap registers 118. State trap registers 118 may be deemed to be an element of read channel 200. The structure and function of state trap registers 118 are relevant to another invention made by the assignee hereof, and the details thereof are not relevant to an understanding of this invention.

During read operations, read channel 200 receives read signal 24 from preamp 22; processes read signal 24 to produce digital read data; and conveys the digital read data to HIDC 32 via internal NRZ data bus 144, port 40 and channel data bus 38. Upon detecting the appropriate bit patterns in read signal 24, channel 200 produces SYNC DET 46 and AM DET 47 to control servo sector timers.

During write operations, write channel 210 receives encoded write data from read channel 200 via channel write data bus 212. In turn, read channel 200 receives write data from HIDC 32 via channel data bus 38, port 40 and internal NRZ data bus 144, encodes the write data, and forwards the encoded data to write channel 210. Write channel 210 performs any required write precompensation and generates serial write data 28 which are conveyed to preamp 22.

Some registers in register set 122 contain parameters that control the read and write operations performed by channel 26. Microprocessor 34 initializes these registers by writing data into the registers via microprocessor bus 36, microprocessor port 120 and register bus 126.

Other registers in register set 122 are used to store state information generated within read channel 200. Microprocessor 34 may read the contents of state trap registers 118 via the data path including register bus 126, microprocessor port 120 and microprocessor bus 36.

Whether reading or writing, microprocessor 34 selects a register by sending the address to register address decoder 124 via microprocessor bus 36, microprocessor port 120 and register address bus 128. Address decoder 124 decodes the address and generates a register select signal 125 that selects the register to be operated upon.

As noted above, channel 26 includes separate bit parallel I/O ports (ports 40 and 120) for exchanging NRZ read data and NRZ write data with HIDC 32 and for providing microprocessor 34 with access to registers in register set 122. Microprocessor port 120 and address decoder 124 provide means for microprocessor 34 to effect direct control over channel 26; microprocessor 34 may effect indirect control via control logic in HIDC 32. Using a dedicated microprocessor port 120 provides microprocessor 34 with a fast and versatile control means while using few of the IC I/O pins of channel 26 and the printed wire connections of PCBA 12 (FIG. 1D). Use of separate I/O ports for data transfer and microprocessor 34 access to register set 122 also permits high speed data transfer to occur without interruption via port 40 despite concurrent lower speed data transfers between register set 122 and microprocessor 34 via microprocessor port 120. Where the need for high speed is less important than the need for a low IC pin count and small IC layout space, microprocessor port 120 may be a serial port, and microprocessor bus 36 a serial bus, for communication with other IC's on PCBA 12.

Use of registers in register set 122 that are writeable by microprocessor 34 to control channel 26 parameters provides means for optimizing channel 26. As optimized, channel 26 is compatible with a wide variety of operating conditions and characteristics of read signal 24. When the disk drive is first powered on (or reset), microprocessor 34 retrieves channel parameters from microprocessor 34 embedded ROM or the ROM 54 and initializes channel 26 by storing these parameters in register set 122. These channel parameters are subsequently used by channel 26 while configuration data are read from reserved data sectors on disks 14. The configuration data are first stored in data buffer 42 (FIG. 1D), and, subsequently, all or part of this configuration data may be stored in RAM 60 (FIG. 1D). Subsequent to recovering configuration data from disks 14, microprocessor 34 uses channel parameters included in the configuration data to initialize register set 122. The parameters contained in the configuration data are specific to disk head, disk zone band, and to track segment.

Any or all of the embedded ROM or embedded RAM in microprocessor 34, ROM 54, RAM 60, data buffer 42, or HIDC 32 may include memory that is part of the channel parameter memory for storing channel parameter data that microprocessor 34 may read and use to program the contents of register set 122. The term "channel parameter storage" as used herein includes any memory in PCBA 12 that provides storage for channel parameter data and channel parameter data. The term "configuration data" as used herein refers to channel parameters recovered from reserved disk tracks and stored in writeable parts of channel parameter storage. Portions of read only memory included in either or both microprocessor 34 or ROM 54 are used as channel start up parameter storage which stores the channel start up parameters used by channel 26 while configuration data are recovered from the reserved disk drive cylinders and perhaps at other times and for other purposes such as error recovery. Channel parameter storage includes channel start up parameter storage. Microprocessor 34 recovers channel start up parameters from channel start up parameter storage and loads these parameters into selected registers in register set 122. The registers initialized during this process include read parameter registers 130, servo burst registers 136, state trap registers 118 and IC mode control registers 138.

Register set 122 includes the following register subsets: read parameter registers 130, write parameter registers 132, servo burst registers 136, channel performance metric (CPM) registers 134, state trap registers 118 and IC mode control registers 138.

IC mode control registers 138 store information used to control the configuration and operational mode for circuitry in channel 26. For example, these registers contain the mode control bits used to activate power saving features in channel 26. Other of the control registers 138 may activate test modes used during production test of channel 26.

Read parameter registers 130 provide parameter and state storage in support of the operation of read channel 200. Write parameter registers 132 provide parameter storage in support of operation of write channel 210. Servo burst registers 136 receive demodulated servo burst information provided during servo read operations. Preferably, the servo burst information is provided via register bus 126 and microprocessor port 120 to microprocessor 34 or, alternately, to other dedicated servo control circuitry (not shown).

State trap registers 118 store values of state variables for circuits in read channel 200. State trap registers 118 include data state trap registers in which values of state variables are trapped at the end of each user-data track sector 92 (FIG. 3B), and include servo state trap registers in which values of state variables are trapped at end of processing each servo ID group 71b (FIG. 3A). The trapped values of state variables enable reestablishing circuit operating conditions on an alternating basis for user-data and servo-data processing.

Channel performance metric (CPM) registers 134 and support circuitry (not shown) provide microprocessor 34 with means for reading the system performance data needed to develop the optimized channel parameters used to control channel 26 during disk drive read and write operations. For the most part, the performance data acquired via CPM registers 134 are provided by a data collecting circuit included in CPM 215. This data collecting circuit monitors and processes signals that cannot be easily monitored and characterized without the use of such a specialized circuit. In some cases, the monitoring circuit provides time average or integrated values for rapidly varying signals in read channel 200.

Although read register input/output (I/O) circuit 140 and write register input/output (I/O) circuit 142 are, for convenience of illustration, shown in FIG. 4 as being single bi-directional lines, preferably, these connections are implemented as a plurality of connections between respective microprocessor addressable registers and specific components of read channel 200 and write channel 210 circuitry.

Individual registers in registers set 122 may, for communication with microprocessor 34, be writeable and readable, readable but not writeable, or writeable but not readable in any suitable combination. Similarly, the circuitry connecting registers in register set 122 to read channel 200 or write channel 210 may be from register to channel, channel to register or bi-directional in a manner suitable for each register. For example, servo burst registers 136 are preferably readable only for communicating with microprocessor 34, and receive data from read channel 200, and do not transfer data to read channel 200. CPM registers 134 preferably receive data from read channel 200 and are readable and writeable by microprocessor 34.

For ease of discussion and illustration, microprocessor addressable registers 122 are shown grouped separately from read channel circuitry 200 and write channel circuitry 210. Preferably, some registers in register set 122 are located near or amongst the read channel 200 or write channel 210 circuitry they serve. Regardless of the register location, register bus 126 and register select signal 125 are routed in an appropriate manner to connect the various registers to decoder 124 and microprocessor port 120.

Port 40 receives user write data from and provides user read data and servo read data to HIDC 32 via channel data bus 38. Within channel 26, NRZ data are exchanged between port 40 and read channel 200 in a bi-directional manner via bi-directional internal NRZ data bus 144. Internal NRZ data bus 144 preferably has the same width as channel data bus 38, for example, eight bits parallel.

During disk drive read operations and while channel 26 is sending data to HIDC 32, read channel 200 provides NRZ read clock 148 to port 40, and port 40 sends this clock to HIDC 32 as NRZ clock 41. NRZ clock 41 is synchronized with NRZ data being conveyed to HIDC 32 via channel data bus 38.

During disk drive write data operations and while HIDC 32 is sending data to channel 26, port 40 also provides NRZ write clock 146 to read channel 200 and write channel 210; NRZ write clock 146 may be generated by a state machine within port 40 or may optionally be acquired from the NRZ clock 41 as provided by HIDC 32. The data received by read channel 200 are encoded by encoder circuitry within read channel 200 and subsequently provided to write channel 210 via channel write data bus 212. Channel write data bus 212 is preferably 9 bits wide. For certain special disk write operations, read channel 200 may provide unencoded write data (data as received from port 40) to write channel 210 via bus 212.

As for channel control logic 43, this is shown as being concentrated in a single functional block for convenience of illustration. Some of the circuitry of channel control logic 43 preferably is located near or amongst the other functional blocks included in channel 26. Some of the signal processing circuitry in channel 26 is pipelined such that certain signals of the set constituting timing and control signals 44 need to be applied to sequential stages of the pipeline with appropriate delays. In order to subordinate minor details in placing focus on significant points, each of a number of timing and control signals that form a set are referred to herein collectively. The signals so collectively referred to include RGATE, WGATE, BGATE, certain timing mode control signals, and certain parameter select signals. Other control signals are exchanged between microprocessor bus 36 and channel control logic 43 via microprocessor port 120 and bus control signal lines 129. Control signal 129 interacts with microprocessor port 120.

Timing and control signals 44 that channel control logic 43 receives include RGATE, and WGATE.

STRUCTURE OF READ CHANNEL & ASSOCIATED PARAMETER STORAGE

Referring to FIG. 5, read channel 200 includes a shared analog signal processing means 220, a servo burst processing means 230, and a shared sampled signal processing means 240. Read channel 200 also includes a set of gain control and filter parameter registers 252, a set of data detection parameter registers 254, a set of timing recovery parameter registers 256 and a set of decoding parameter registers 258. These four sets of parameter registers are collectively identified as parameter registers 130 in FIG. 4. These four sets of parameter registers include parameter registers described below.

Analog signal processing means 220 provides conditioning of read signal 24 to produce a CTF signal 283 which is an analog signal having substantially the same information content as read signal 24; during a user-data read operation, each of these signals sequentially represents servo data, servo bursts, and user data. Servo burst processing means 230 provides further processing of the portion of CTF signal 283 representing servo bursts 86 (FIG. 3A). Shared sampled signal processing means 240 provides sampled signal processing of the portions of CTF signal 283 representing servo data and user data.

Analog signal processing means 220 includes an automatic gain control and continuous time filter ("AGC and CTF circuit 250") that processes read signal 24 to provide CTF signal 283. Analog signal processing means 220 also includes a parameter switching means for circuit 250 comprising a multiplexor means ("MUX 260") that is controlled by parameter select signal 262.

Servo burst processing means 230 includes a servo burst demodulator circuit 232 and an analog-to-digital converter ("ADC 234"). Servo burst demodulator 232 operates on CTF signal 283 to generate a demodulated analog servo signal 233 which is a time sequential analog signal representation of the 2 to 8 short bursts included in servo bursts 86 (FIG. 3A) that are conveyed to ADC 234 analog signal inputs. ADC 234 digitizes demodulated analog servo signal 233 and sends the digitized servo burst data via read register I/O circuitry 140 into servo burst registers 136 (FIG. 4). The digitized servo burst data generated by ADC 234 are preferably one digital word for each of the 2 to 8 short bursts included in servo bursts 86; the width of these words is preferably 10 or more bits. Microprocessor 34 reads the servo burst information from servo burst registers 136 for use in effecting fine position servo control during track following operations.

Shared sampled signal processing means 240 includes a data detection circuit 242, a timing recovery circuit 244, and an encoding-decoding circuit ("ENDEC circuit 246"). Data detection circuit 242 preferably uses a PRML or another sampled signal detection method to provide detection means to process CTF signal 283 and generate one or more sampled data outputs. Timing recovery circuit 244 generates a set of control signals collectively referred to as read clock 272. The control signals in this set are distributed throughout channel 26. The phases of signals in this set are varied to ensure reliable operation of circuitry in channel 26. ENDEC circuit 246 is operative during user data read operations to produce NRZ data that are conveyed to HIDC 32 via internal NRZ data bus 144, port 40 (FIG. 4) and channel data bus 38. ENDEC circuit 246 also generates a read clock 148 which is conveyed to HIDC 32 via port 40 as NRZ clock 41.

Shared sampled signal processing means 240 also includes a parameter switching means for data detection circuit 242 comprising a multiplexor means ("MUX 264") that is controlled by parameter select signal 266. Shared sampled signal processing means 240 also includes a parameter switching means for timing recovery circuit 244 comprising a multiplexor means ("MUX 268") that is controlled by parameter select signal 270. Shared sampled signal processing means 240 also includes a parameter switching means for ENDEC circuit 246 comprising a multiplexor means ("MUX 274") that is controlled by parameter select signal 275.

Preferably, data detection circuit 242 generates three different sample data signals: a sample data signal 334, an equalized sample data signal 288 and a detected data signal 366. Data detection circuit 242 also includes a servo address mark detector ("SAM detector 376") (FIG. 6) which implements a means for detecting SAM 72 (FIG. 3A) and issuing AM DET 47.

Each of sample data signal 334 and equalized sample data signal 288 preferably defines a sequence of channel symbols each of which has a parallel-by-bit format. Detected data signal 366 preferably has a serial-by-bit format in which each channel symbol is defined by a time spaced-apart group of bits. Each channel symbol in sample data signal 334 represents the amplitude of CTF signal 283. Each channel symbol in equalized sample data signal 288 represents the amplitude of an equalized signal, and each symbol in detected data signal 366 constitutes a detected symbol. Channel symbols are processed at a rate controlled by read clock 272. Sample data signal 334, equalized sample data signal 288, and detected data signal 366 are conveyed to several other circuit blocks in read channel 200.

A reference clock ("REF CLK 245") is provided to timing recovery circuit 244 for use as a timing reference when channel 26 is not reading data, i.e., while idle or writing data. Timing recovery circuit 244 uses equalized sample data signal 288 and sample data signal 334 as timing references during disk read operations.

As for the parameter switching means for AGC and CTF circuit 250, MUX 260 operates under control of parameter select signal 262 to convey a selected parameter from gain control and filter parameter registers 252 to circuit 250. MUX 260 conveys data parameters to circuit 250 to control processing of read signal 24 for recovering data read from a user-data sector 92 (FIG. 3B), and conveys servo parameters to circuit 250 to control processing read signal 24 for recovering data read from servo ID group 71b (FIG. 3A), and conveys burst parameters to circuit 250 to control processing of read signal 24 for recovering burst data read from the servo bursts group 71c portion of track segment 68 (FIG. 3A).

As for the parameter switching means for data detection circuit 242, MUX 264 operates under control of parameter select signal 266 to convey a selected parameter from data detection parameter registers 254 to circuit 242. MUX 264 conveys data parameters to circuit 242 to control processing of CTF signal 283 for recovering data read from a data sector 92 (FIG. 3B) and conveys servo parameters to circuit 242 to control processing of CTF signal 283 for recovering data read from servo ID group 71b (FIG. 3A).

As for the parameter switching means for timing recovery circuit 244, MUX 268 operates under control of parameter select signal 270 to convey a selected parameter from timing recovery parameter registers 256 to circuit 244. MUX 268 conveys data parameters to circuit 244 to control processing of CTF signal 283 for recovering data read from a data sector 92, and conveys servo parameters to circuit 244 to control processing of CTF signal 283 for recovering data read from servo ID group 71b.

As for the parameter switching means for ENDEC circuit 246, MUX 274 selectively operates under control of parameter select signal 275 to convey a selected parameter from decoding parameters registers 258 to circuit 246. MUX 274 conveys data parameters to ENDEC circuit 246 to control processing of detected data signal 366 recovered from a data sector 92 (FIG. 3B), and conveys servo parameters to circuit 246 to control processing of detected data signal 366 recovered from a servo ID group 71b (FIG. 3A).

Each parameter select signal may be a single signal or it may be a set of two or more control signals. For example, gain control and filter parameter registers 252 include three parameter registers so, preferably, parameter select signal 262 includes three individual register select control signals, one for each of the data, servo and burst registers. Similarly, each of parameter select signals 262, 266, 270, and 275 represent a control signal set that may include more than one control signal. When SGATE is negated (not asserted), parameter select signals 262, 266, 270, and 275 cause a MUX to select user-data parameters; when SGATE is asserted and BGATE is negated, parameter select signals 262, 266, 270, and 275 cause a MUX to select servo parameters; and when both SGATE and BGATE are asserted, parameter select signal 262 causes MUX 260 to select the burst parameter registers in gain and control parameters registers 252. The assertion of BGATE has no effect on the state of parameter select signals 266, 270 and 275.

Each individual register select signal in parameter select signals 262, 266, 270, and 275 is asserted and negated as appropriate to operational mode, as affected by SGATE and BGATE, multiple times per disk revolution approximately coincident with the arrival of the beginning and end of each track segments 68 (FIG. 3A), track segment 90 (FIG. 3B) and servo bursts 86 track element at the selected transducer 20. To compensate for circuit delays in read channel 200, the assertion and negations times of parameter select signals 262, 266, 270, and 275, and the corresponding individual register select signals may be separately delayed from the assertion and negation times of SGATE.

Servo data written in servo-data regions 64 are preferably written using a servowriter that is operated in carefully controlled temperature and other ambient conditions whereas the user data are written under temperatures and conditions consistent with the end use of the disk drive. The servo-data channel frequency varies from servo zone band to servo zone band, S1 to SN, and differs from the user-data channel frequency on at least some of the data tracks. Consequently, the frequency, amplitude and spectral content characteristics of read signal 24 produced while reading data sectors 92 will often differ significantly from those produced while reading servo track segments 68. Accordingly, the ability to adjust the channel parameters to separately optimize the channel for reading data sectors 92 and servo track segments 68 provides more effective gain control, filtering, data detection and timing recovery by the read channel. Each register of parameter registers 252, 254, 256 and 258 is coupled to register bus 126 and is independently writeable by microprocessor 34. Microprocessor 34 can update the channel parameters for servo-data processing to provide for the selected transducer 20 moving across a servo zone boundary 63 (FIG. 2C) during track-seeking operations. Similarly, microprocessor 34 can update the channel parameters used for data sector 92 (FIG. 3B) processing when a track-seeking operation moves the selected transducer 20 to a target track that is in a new data zone band, Di, (FIG. 2B). Servo parameters are best updated in a timely manner during the track-seeking operation as transducer 20 crosses each servo zone boundary. Data parameters need be updated only once and at any time prior to initiating read or write operations in the new data zone band, Di.

Figure 6:
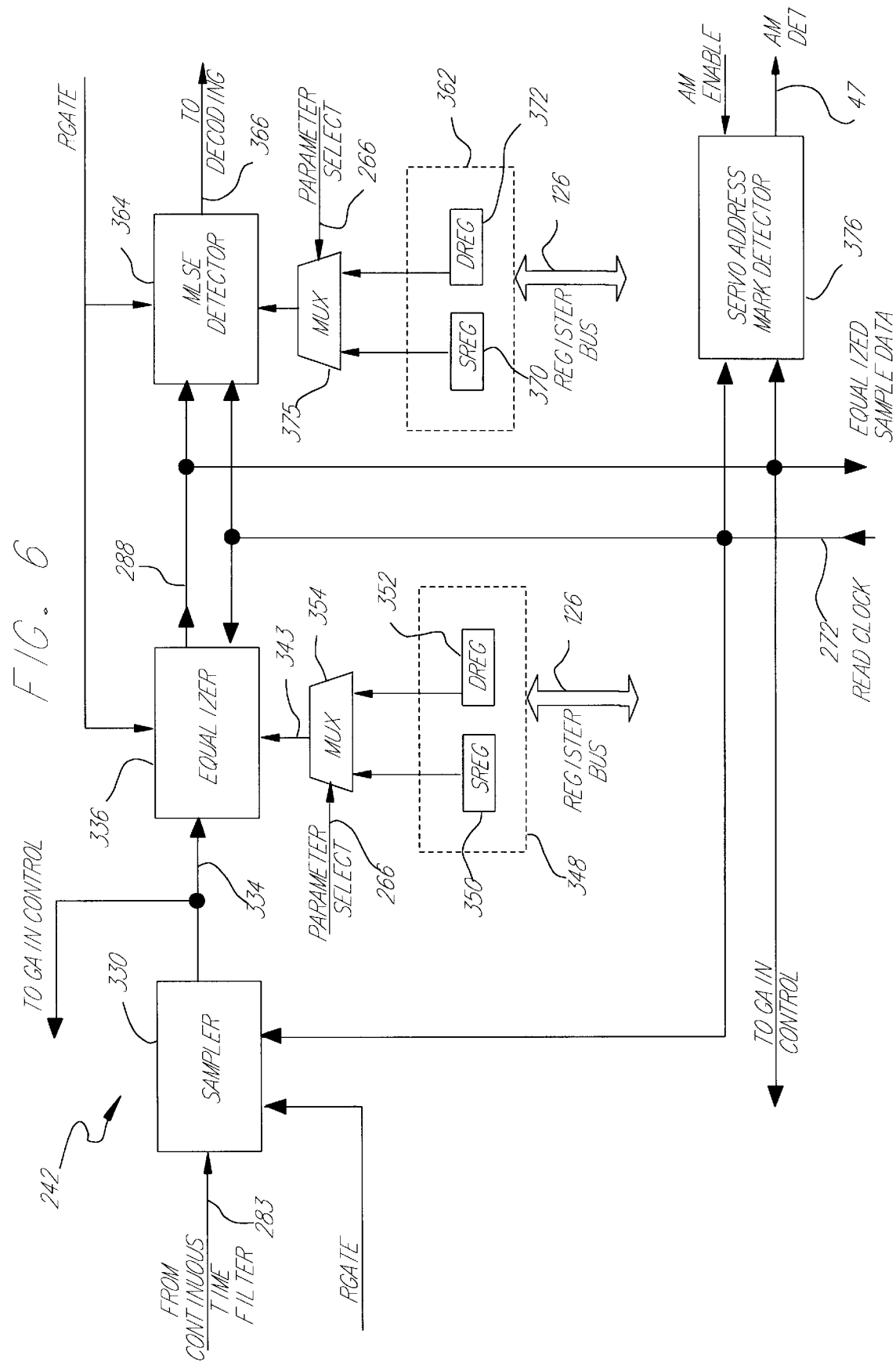
FIG. 6 is a block diagram of a data detection circuit employing MLSE data detection, which has suitable structure to implement circuit 242 of FIG. 5.

Referring to FIG. 6, the gain control feedback loop includes a sampler 330 and an equalizer 336. Sampler 330 includes sample and hold circuitry and preferably also includes analog-to-digital converter circuitry. Sampler 330 samples CTF signal 283 to produce sample data signal 334 at a rate governed by read clock 272. Suitable sampling and A/D circuitry for implementing sampler 330 is taught in the prior art. Sampler 330 provides sample data signal 334 to the signal input of equalizer 336.

Equalizer 336 responds to sample data signal 334 to produce equalized sample data signal 288. The values of equalized sample data signal 288 are more nearly uniform than the values of sample data signal 334. Equalized sample data signal 288 is conveyed to MLSE detector 364, and to error discriminators of the kind customarily incorporated in timing recovery and AGC circuits. Preferably, equalizer 336 generates one digital word of equalized sample data signal 288 for each digital word of sample data received from sampler 330. Equalizer 336 generates equalized sample data signal 288 at a rate governed by read clock 272. Preferably, equalizer 336 is a finite impulse response (FIR) digital filter having an n delay structure, where n is an integer the value of which may vary with the specific implementation. A suitable FIR filter design is described below with reference to FIG. 10.

Equalized sample data signal 288 has three ideal or desirable values, referred to herein as +1, 0, and −1. In operation, the automatic gain control circuitry causes equalized sample data signal 288 repeatedly to be approximately equal to the ideal values, regardless of variations in peak to peak amplitude of read signal 24. Equalized sample data values may be larger or smaller than the ideal values.

SHARED SIGNAL DETECTION MEANS

Referring to FIG. 6 again, data detection circuit 242 includes a feedforward path including sampler 330, equalizer 336, and a maximum likelihood sequence estimating detector ("MLSE detector 364"). This feedforward path receives CTF signal 283 and produces detected data signal 366 under control of switched parameters. Circuit 242 is subject to control by parameter registers 254 (FIG. 5) which are implemented by parameter registers 348 for storing the switched parameters for controlling equalizer 336, and parameter registers 362 for storing the switched parameters for controlling MLSE detector 364. Parameter registers 348 include servo equalizer parameter register ("SREG 350"), data equalizer parameter register ("DREG 352"). Parameter registers 362 include a servo detection parameter register ("SREG 370") and a data detection parameter register ("DREG 372").

The means for controlling circuit 242 further includes a multiplexor means ("MUX 354") and a multiplexor means ("MUX 375") that implement MUX 264 of FIG. 5. MUX 354 operates under control of parameter select signal 266 to provide a parameter switching means for conveying a selected parameter to control equalizer 336. MUX 375 operates under control of parameter select signal 266 to provide a parameter switching means for conveying a selected parameter to control MLSE detector 364. Circuit 242 also includes a servo address mark detector ("SAM detector 376").

The feedforward path of circuit 242 provides a shared signal sampling means, a shared discrete time filter means and a shared detection means. The shared signal detection means includes sampler 330, equalizer 336, and MLSE detector 364.

Figure 10:
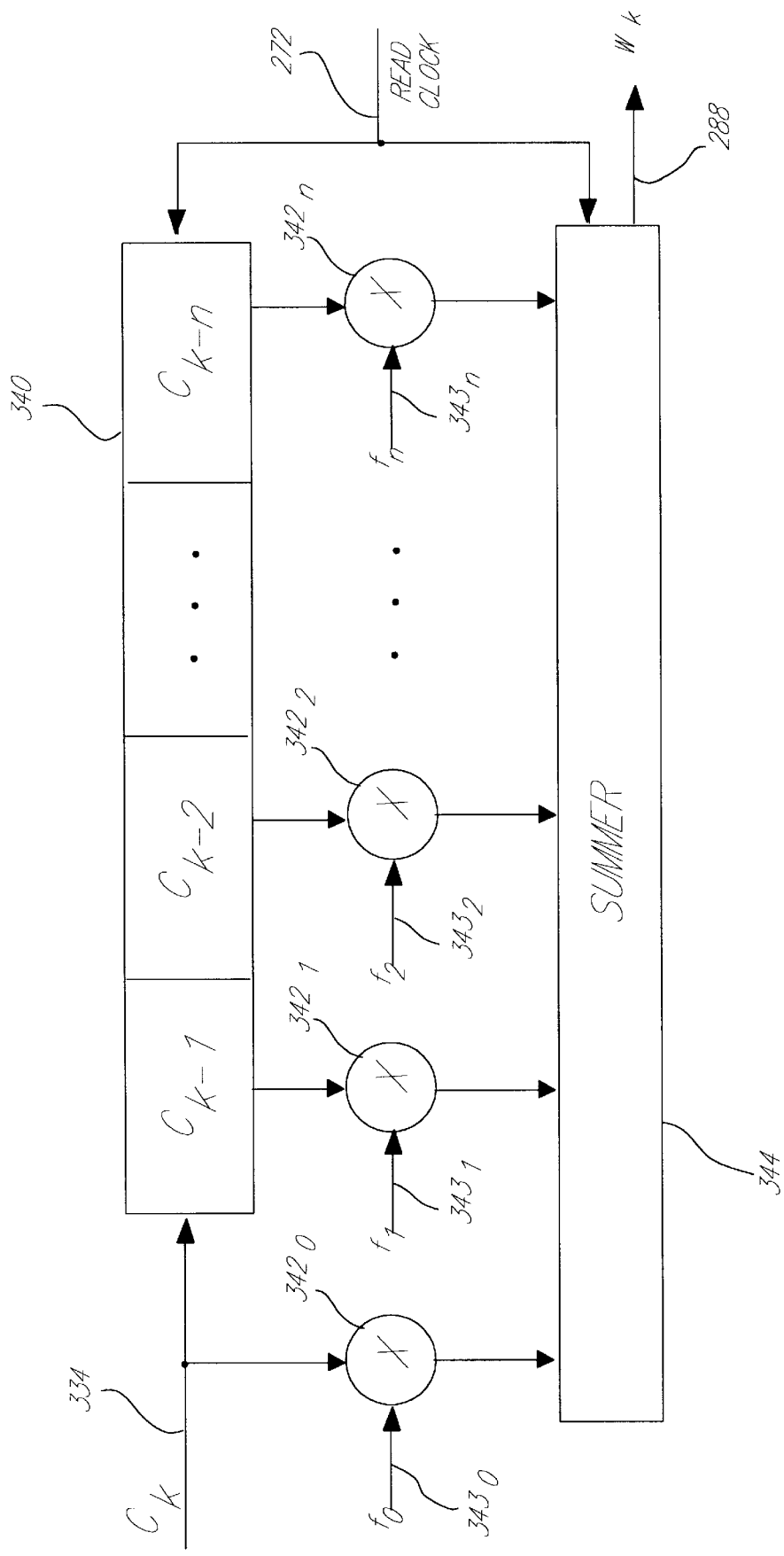
FIG. 10 is a block diagram of a suitable implementation of an equalizer 336 suitable for use in data detection circuit 242 shown in FIG. 6.

Preferably, equalizer 336 is a finite impulse response (FIR) digital filter having an n delay structure, where n is an integer the value of which may vary with the specific implementation. A suitable FIR filter design is illustrated in FIG. 10.

The shared detection means includes MLSE detector 364 that detects symbols sequentially defined in equalized sample data signal 288 and generates detected data signal 366 at a rate determined by read clock 272. Preferably, MLSE detector 364 is a Viterbi detector. The term "Viterbi detector" as used herein has its customary meaning in this art. That is, a Viterbi detector is any of a class of Maximum Likelihood Sequence Estimation (MLSE) detectors which employs a Euclidean distance optimization algorithm for detection. Detector 364 provides sample data signal 366 to ENDEC circuit 246 (FIG. 5).

The design of Viterbi detectors and other kinds of MLSE detectors are taught in the prior art. One example of a Viterbi detector is illustrated in U.S. Pat. No. 4,644,564 to Dolivo et al., issued Feb. 17, 1987, and is incorporated herein by reference. Other kinds of MLSE detectors may also be employed for detector 364 an example being a Trellis code detector. A suitable Trellis code detector is illustrated in U.S. Pat. No. 4,888,775 to Karabed, et al. is incorporated herein by reference. A Matched Spectral Null Trellis Code detector disclosed in U.S. Pat. No. 4,888,779 to Karabed, et al., is also a suitable detector incorporated herein by reference.

Although data detection circuit 242 employs sampled channel data detection and PRML equalization and data detection methods, many aspects of the invention may also be employed to good advantage in a peak detection system.

Each of the shared means in the feedforward path processes both data sectors 92 (FIG. 3B) and servo ID group 71b (FIG. 3A) each of which may have been recorded using a substantially different channel frequency Sharing these means is accomplished by using timing recovery circuit 244 (FIG. 5) as data clock recovery means that generates a read clock 272 that is frequency locked and phase aligned with equalized sample data signal 288 regardless of the kind of data being processed. Timing recovery circuit 244 generates such a data clock by extracting clock frequency and phase information from the equalized sample data signal 288 and using this information to generate read clock 272.

Normally, timing recovery circuit 244 achieves frequency lock and phase alignment while shared sampled signal processing means 240 is processing PLL 74 (FIG. 3A) or PLL 98 (FIG. 3B). In view of this, sampler 330 employs asynchronous sampling of CTF signal 283 while processing PLL 74 or PLL 98, and sampler 330 provides synchronous sampling while processing servo ID group 71b elements following PLL 74 and while processing data sector 92 elements that follow PLL 98. Circuitry suitable for implementing sampler 330 is taught in the prior art.

Referring to FIG. 10, a finite impulse response (FIR) digital equalizer receives sample data signal 334 which are discrete time sampled values ($C_k$) and generates equalized sample data signal 288 which are equalized discrete sample data $W_k$). The FIR digital equalizer includes an n delay shift register 340, n+1 multipliers $342_0$ to $342_n$ which receive filter coefficients $f_0$ $343_0$ to $f_n$ 343, and summer 344 coupled as illustrated to implement the following equation:

$$W_k = \sum_{i=0}^{n} f_i C_{(k-i)}$$

In the equation, the $f_i$ parameters ($f_0$, $f_1$, . . ,$f_n$) are digital filter coefficients (tap weights) which determine the FIR equalizer response. The number of tap weights affect the performance of equalizer 336 and vary with implementation. For example, from 3 to 30 tap weights may be employed. The tap weights are selected to provide partial response equalization of sampled data signal 334.

Each cell of shift register 340 stores one word $C_k$ of the words defined in sample data signal 334. Sample data are shifted into C0 and through shift register 340 at a rate determined by read clock 272; sample data shifts one cell position per clock cycle. Summer 344 begins issuing significant equalized sample data ($W_k$) n clock cycles after the first word $C_k$ is stored in shift register 340.

Parameter switching means for data detection circuit 242 include parameter switching means for equalizer 336 and parameter switching means for MLSE detector 364. MUX 354 operates under control of parameter select signal 266 to provide a parameter switching means for conveying a selected parameter from SREG 350 and DREG 352 to control equalizer 336. The outputs of SREG 350 and DREG 252 are conveyed to the inputs of MUX 354, one of SREG 350 or DREG 352 is selected by parameter select signal 266 and the contents of selected register are conveyed to the output of MUX 354 for application to the $f_i$ inputs (tap weight inputs) of equalizer 336. SREG 350 stores filter coefficients $f_i$ that are used while equalizer 336 is processing sample data signal 334 recovered from servo ID groups 71b (FIG. 3A), and DREG 352 stores filter coefficients $f_i$ that are used while equalizer 336 is processing sample data signal 334 recovered from data sectors 92 (FIG. 3B). Parameter switching occurs multiple times per disk revolution and coincident with the arrival of track elements at the selected transducer 20.

Microprocessor 34 initializes SREG 350 and DREG 352 by writing the parameters into SREG 350 and DREG 352 via microprocessor bus 36, microprocessor port 120 and register bus 126. Disk drive calibration processes are used to determine the tap weights microprocessor 34 stores in SREG 350 and DREG 352. Immediately after the disk drive is powered on (or reset), microprocessor 34 reads start up tap weights from parameter tables in either its embedded ROM or ROM 54 and stores these parameters in SREG 350 and DREG 352. These start up tap weights are used while configuration data are read from data sectors in reserved tracks on disks 14. The configuration data are first stored in data buffer 42 (FIG. 1D) and, all or part of the data may be subsequently stored in registers within microprocessor 34 or RAM 60 embedded as channel parameter memory as part of the channel parameter data. The configuration data include run time optimized tap weights that microprocessor 34 stores in SREG 350 and DREG 352. Preferably, the configuration data include separate parameters for each transducer 20, servo zone band, $S_i$ (FIG. 2B), and data zone bands, $D_i$ (FIG. 2B), i.e., for each head-zone band combination.

The start up tap weight values are determined during design verification tests conducted during disk drive devel opment. These start up parameters are optimized for reading a particular cylinder or set of reserved cylinders that contain the configuration data and are subsequently embedded in the ROM control programs used by microprocessor 34. The run time optimized tap weights are preferably determined during factory tests performed as part of the disk drive manufacturing process. This process determines best estimate optimum servo and data tap weight values to be used with each transducer 20 while it is recovering data in each zone band. The optimized data are stored as configuration data in the subject disk drive reserved cylinders, and are used in all subsequent disk drive run time operations.

The optimization process chooses tap weights $f_0$ to $f_n$ with objective of realizing the minimum mean square error (MSE) between idealized (or model) sample data and equalized sample data signal 288 generated by equalizing sample data signal 334 recovered while reading test data. Here test data are information recorded in track segments (FIG. 3A and FIG. 3B) and error is the difference between an equalized sample data signal 288 word and a corresponding ideal sample data word. For example, the optimization process may use a first set of test tap weights to read a data sector 92 (FIG. 3B) while measuring the mean square error between ideal equalized sample data and equalizer 336 generated equalized sample data signal 288. By systematically varying the tap weights, repeating the test, and comparing mean square error result, it is possible to determine a nearly optimum set of tap weights. The ideal sample data are known if known test data are written to the data sector 92 to be used during the test process. If most bits in the test data are recovered without error, good results may be obtained in blind tests that use unknown data. One benefit of proper equalizer 336 operation is to reduce inter-symbol interference induced read error rate that occurs while recovering information recorded at high linear bit densities.

Although equalizer 336 has been described as a digital equalizer functioning in conjunction with a sampler having an A/D converter such as sampler 330, it may also be in the form of an analog equalizer for equalizing analog continuous time or sampled signals. For example, such analog equalizer may employ any of a number of prior art approaches including 7-th order Bessel Low Pass Filtering (LPF) and boost, 7-th order equiripple LPF and boost, 4-th order Butterworth LPF and boost, 5-th order LPF and boost, or multi-tap transversal filters.

As noted above, the data detection circuitry illustrated in FIG. 6 includes shared detection means which includes MLSE detector 364 that is preferably a Viterbi detector. The Viterbi detector described in U.S. Pat. No. 4,644,564 implements a PR4 detection scheme. Such PR4 detection scheme is usually defined by a channel transfer polynomial, P(D), where D is the delay operator. Such channel transfer polynomials describe the relationship between the write data sequence, $\{a_n\}$, and the readback sample sequence, $\{w_n\}$, at the input to the Viterbi detector 364. For PR4, $P(D)=1-D^2$, so that the write data and the readback samples are related by $w_n=a_n-a_{n-2}$. The channel transfer polynomials set out in Table 1 describe suitable sampled signal channel processing schemes.

TABLE 1

| SIGNAL TYPE | INPUT/OUTPUT RELATION | POLYNOMIAL |
|---|---|---|
| Dicode | $w_n = a_n - a_{n-1}$ | $P(D) = 1 - D$ |
| PR4 | $w_n = a_n - a_{n-2}$ | $P(D) = 1 - D^2$ |
| EPR4 | $w_n = a_n + a_{n-1} - a_{n-2} - a_{n-3}$ | $P(D) = 1 + D - D^2 - D^3$ |
| E$^2$PR4 | $w_n = a_n + 2a_{n-1} - 2a_{n-3} - a_{n-4}$ | $P(D) = 1 + 2D - 2D^3 - D^4$ |

More generally, read channel 200 and write channel 210 can use any sampled signal processing scheme with a channel transfer polynomial of the form:

$P(D) = \sum p_k D^k$, where $\{P_k\}$ are constants which uniquely define the relationship between the write data sequence and the readback sample sequence. (For example, with PR4 signals, $P(D)=(1-D)(1+D)=1-D^2$ as shown in Table 1.)

While preferred implementations employ a PR4 polynomial and a Viterbi detector 364, alternative embodiments may employ other channel transfer polynomials and detectors.

MLSE detector 364 used in preferred embodiments of this invention compares the sequence of equalized sample data signal 288 to all possible sequences prescribed by the channel transfer polynomial. The detected data sequence is the sequence which is the closest to the sequence of equalized sample data with respect to a Euclidean distance metric. In the preferred embodiment, this is implemented recursively using the Viterbi algorithm.

SREG 370 and DREG 372 store detection parameters that are the threshold data or weights used by MLSE detector 364. For example, when using a Viterbi detector and PR4 equalized sample data signal 288, SREG 370 and DREG 372 may contain a single threshold value that is used by detector 364 to differentiate both +1 and −1 operands from 0 operands. Alternately, each of SREG 370 and DREG 372 may contain two threshold values, one threshold for differentiating +1 from 0 and the other for differentiating −1 operands from 0. For more complex systems, each register may contain two or more parameters that are weights used to affect selection of the most probable detected data signal 366 from a set of options.

The embodiment of data detection circuit 242 (FIG. 5) illustrated in FIG. 6 provides parameter switching means for MLSE detector 364. MUX 375 operates under control of parameter select signal 266 to provide a parameter switching means for conveying a selected parameter from SREG 370 and DREG 372 to control MLSE detector 364. MUX 375 conveys the outputs of either SREG 370 or DREG 372 to the control inputs of MLSE detector 364. SREG 370 stores the servo detection parameters used while MLSE detector 364 is processing equalized sample data signal 288 recovered from servo ID group 71b (FIG. 3A), and DREG 372 stores data detection parameters used while MLSE detector 364 is processing equalized sample data signal 288 recovered from a data sector 92 (FIG. 3B). Parameter switching occurs multiple times per disk revolution and coincident with the arrival of track elements at the selected transducer 20.

Detection parameters as stored in SREG 370 and DREG 372 are preferably provided for all servo zone bands, Si, (FIG. 2B) and all data zone bands, Di, (FIG. 2B) associated with each transducer 20. Microprocessor 34 loads detection parameters into SREG 370 and DREG 372. Microprocessor 34 acquires start up detection parameters from tables stored in microprocessor 34 ROM or ROM 54 (FIG. 1D) embedded parameter tables and acquires drive optimized run time detection parameters from configuration data acquired from reserved disk cylinders during disk drive start up.

As is the case for equalization parameters, near optimum detection parameters values are developed during disk drive manufacturing test processes and stored as configuration data in the reserved disk drive cylinders. These processes select detection parameters so as to minimize the misdetection rate for detector 364.

Equalized sample data signal 288 are provided to servo address mark detector ("SAM detector 376"). SAM detector 376 is employed during disk drive start up, and at other times, and provides read channel 200 (FIG. 4) with means to locate the beginning of a servo track segment 68 (FIG. 3A) and in particular the location of a SAM 72 (FIG. 3A). During normal disk drive operation, sector timers in HIDC 32 are used to predict the times that the beginning of a servo track segment 68 (FIG. 3A) or data sector 92 (FIG. 3B) will arrive at the selected transducer 20 (FIG. 1D). SAM detector 376 provides means to quickly synchronize the sector timers in HIDC 32.

The sector timers in HIDC 32 are synchronized with the arrival time of SSM 76 (FIG. 3A) during disk drive start up calibration procedures as well as during disk drive error recovery procedures used in the event that the timers lose synchronization due to operational errors. When the disk drive is in power down state, transducers 20 are parked in a transducer 20 landing zone band and disks 14 are not rotating. The disk drive start up operations cause disks 14 to begin rotating and spin up to an approximately constant angular velocity. Start up operations also cause transducers 20 to be moved out of the landing zone band and over recorded information. During this process, the head-positioning servo cannot determine the radial position of transducers 20 or radial relative surface velocity except by reading and processing TRK ID 78 or redundant TRK ID 79 (FIG. 3A). When such radial velocity is not known, there is risk that HSA will encounter mechanical limits (crash stops) with sufficient force that disk 14 or transducer or both incur physical damage. In view of this, it essential that the sector timers be synchronized and that the control of the transducer position and velocity become effective in the shortest time possible. In addition, the sector timers in HIDC 32 may lose synchronization due to operational errors caused by noise in recovered signal or due to environmental disturbances an example being shock impulses that perturb disk rotational speed. Also, when transducer 20 is track following near a servo zone boundary 63, mechanical shock or vibration may cause transducer 20 to cross servo zone boundary 63 which in turn may cause inability to recover servo ID group 71b because of incompatibility between recorded data and read clock 272 frequency.

The preferred SAM 72 is defined to enable the use of SAM detector 376 that can easily distinguish SAM 72 (FIG. 3A) from other data recorded on disk 14, notwithstanding erroneous reading of one or more bits of SAM 72. This objective is met by selecting a bit pattern for SAM 72 that violates the run length constraints used to record all other data recorded on disk 14 and that is read error tolerant. For example, for an 8/9, d=0, k=4 PRML code, the bit pattern for SAM 72 may include a string of from 9 –15 consecutive zeros, which falls outside the required maximum consecutive zero constraint of the code. Since SAM 72 is included as the first information unit in all servo track segments, it is possible to locate a SAM 72 and synchronize the sector timers in one sector time or less, a small fraction of the period of disk rotation.

A search for SAM 72 is enabled when HIDC 32 causes control signals AM ENABLE and RGATE to be asserted. While AM ENABLE and RGATE are asserted, SAM detector 376 processes equalized sample data signal 288 and asserts control signal AM detect 47 when a SAM 72 is detected. AM detect 47 is conveyed to HIDC 32. Upon receiving AM detect 47, HIDC 32 initiates a read operation to search for and locate SSM 76 the detection of which causes read channel 200 to issue SYNC DET 46 (FIG. 1D) to HIDC 32. Sector timers in HIDC 32 are synchronized with the assertion time of SYNC DET 46. Detection of SSM 76 must occur within the transit time of servo track segment 68; otherwise, the search for SSM 76 is abandoned and the search for SAM 72 is resumed.

During searches for SAM 72, timing recovery circuit 244 uses REF CLK 245 as a basis for generating read clock 272. Consequently, SAM 72 is recovered using equalized sample data signal 288 and read clock 272 that are asynchronous. The operating frequency of REF CLK 245 is selectable and is set to a frequency consistent with the servo zone band $S_i$ expected to be under selected transducer 20. When transducer 20 is located near a servo boundary or where there is large uncertainly as to the radial position of the transducer 20, the search for SAM 72 is conducted while alternately using more than one reference frequency.

Alternate embodiments of data detection circuit 242 could employ SAM detector 376 that uses detected data signal 366 as input signal.

Preferably, SAM detector 376 includes an input data detector that converts equalized sample data into binary data, a shift register to store detected bit sequences, a SAM comparand register containing the objective SAM 72 bit pattern, and a set of comparison logic for comparing detected bit sequences with the contents of the comparand register. For example, SAM detector 376 may have an implementation similar to the sync mark detector discussed below in relation to FIG. 9A. Alternatively, SAM detector 376 may be a counter for counting the absolute value of successive equalized sample data signal 288 words that are less than a threshold.

SHARED PATTERN DETECTOR

Figure 7:
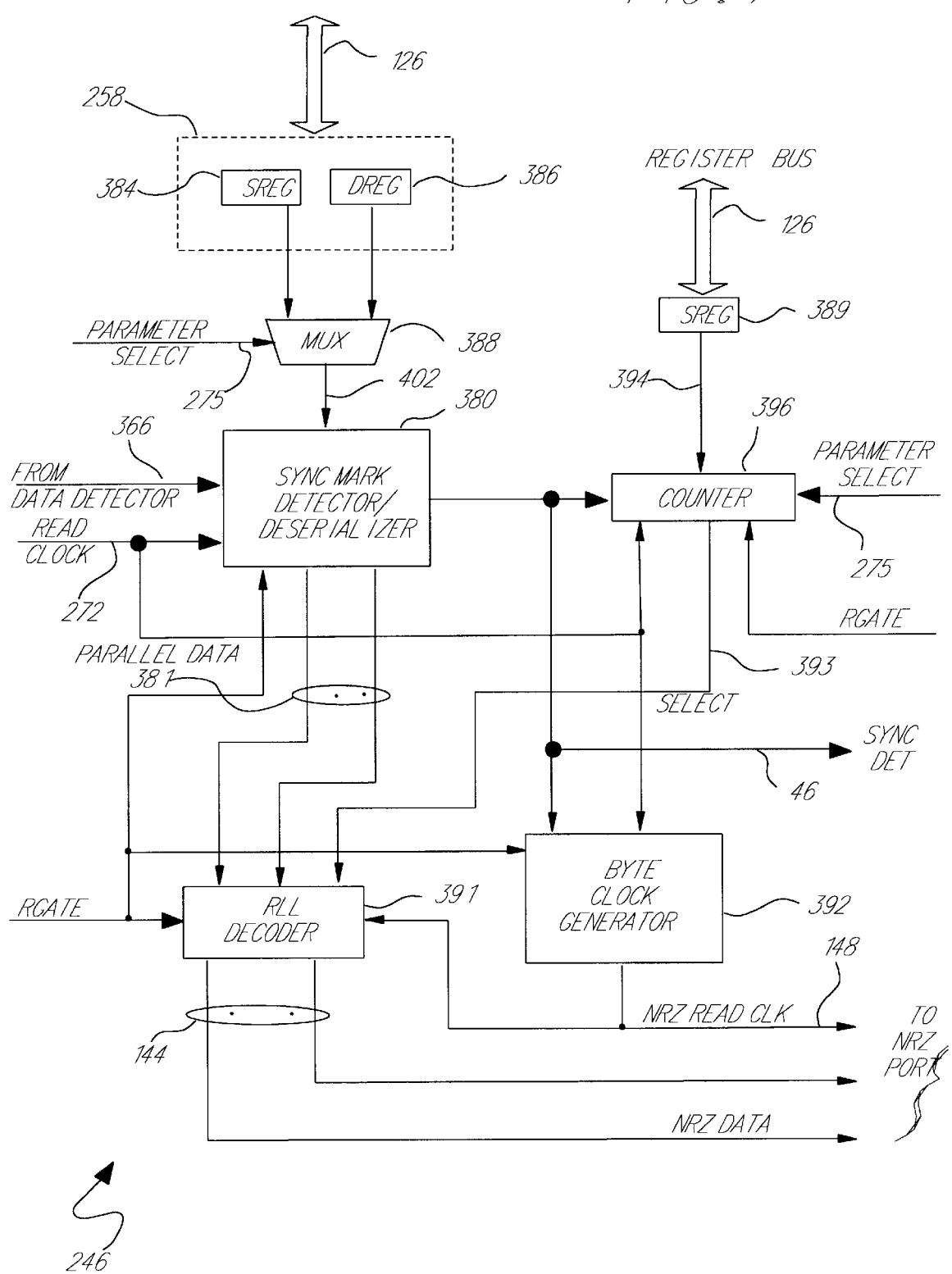
FIG. 7 is a block diagram of a suitable implementation of shared sync mark detecting structure including circuitry in the read path of ENDEC circuit 246 of FIG. 5.

Referring to FIG. 7, the read path of ENDEC circuit 246 (FIG. 5) includes a shared sync mark detector-deserializer ("shared pattern detector 380"), the preferred embodiment of which is shown in FIG. 9A. This read path further includes an RLL decoder 391, a counter 396, and a byte clock generator 392.

Shared pattern detector 380 communicates with circuits external to ENDEC circuit 246. To this end, it has an input for receiving detected data signal 366 from circuit 242 (FIG. 5), an input for receiving read clock 272 from timing recovery circuit 244 (FIG. 5), an input for receiving a reference pattern 402 from a multiplexor means ("MUX 388"), and an output on which it produces SYNC DET 46. MUX 388 implements MUX 274 (FIG. 5) for switchably conveying parameters from decoding parameter registers 258 to shared pattern detector 380. Registers 258 include SREG 384 and DREG 386. Another multiplexor means ("MUX 379"-FIG. 8B) implements part of a parameter switching means. Shared pattern detector 380 communicates with other circuits within ENDEC circuit 246. To this end, it has an input on which it receives RGATE from channel control logic 43, an output on which provides SYNC DET 46, and an output on which it provides data 381 to RLL decoder 391.

Significantly, shared pattern detector 380 detects both the servo-sync marks (SSM 76) and the data-sync marks (DSM 100), and upon each such detection it asserts SYNC DET 46.

To enable shared pattern detector 380 to detect both types of sync marks, MUX 388 is controlled by parameter select signal 275 to convey either a servo reference pattern or a data reference pattern to shared pattern detector 380. The servo reference pattern is so conveyed from SREG 384, and the data reference pattern is conveyed from DREG 386. Parameter select signal 266 selects SREG 384 when data recovered from a servo track segment 68 (FIG. 3A) are to be processed and selects DREG 386 when data recovered from a data sector 92 (FIG. 3B) are to be processed. Microprocessor 34 loads SREG 384 with the servo reference pattern that matches the pattern of SSM 76, and loads DREG 386 with the data reference pattern that matches the pattern of DSM 100.

In addition to its sync mark detecting function, shared pattern detector 380 deserializes detected data signal 366 and generates parallel data 381 which are input to RLL decoder 391. RLL decoder 391 translates parallel data 381 and generates NPZ data which are conveyed to HIDC 32 via internal NRZ data bus 144, Port 40 (FIG. 4) and channel data bus 38 (FIG. 4). Read clock 272 is also input to byte clock generator 392 which generates NRZ read clock 148 which is conveyed along with the NRZ data to HIDC 32 via Port 40 (FIG. 4) and channel data bus 38 (FIG. 4). The NRZ data on internal NRZ data bus 144 and channel data bus 38 are synchronized with read clock 272.

Preferably, RGATE is asserted while PLL 74 (FIG. 3A) or PLL 98 (FIG. 3B) is under the selected transducer 20. The assertion of RGATE enables shared pattern detector 380 to process detected data signal 366. During this processing, each serial data bit recovered by the selected transducer 20 and presented to shared pattern detector 380 data inputs as detected data signal 366 are shifted into and through shift register 404 (FIG. 9A). As detected data signal 366 are shifted through shift register 404, detector 400 (FIG. 9A) compares sync code 402 with the serial data contained in shift register 404, and when a full or sufficiently close match occurs, i-of-m summer-comparator 410 issues a SYNC DET 46 pulse which is conveyed to HIDC 32. Normally, such match occurs when shift register 404 contains data bits recovered from a SSM 76 (FIG. 3A) and sync code 402 is presenting the servo sync code stored in parameter register 384, or when shift register 404 contains data bits recovered from a DSM 100 (FIG. 3B) and sync code 402 is presenting the data sync code stored in parameter register 386. Circuit means within PCBA 12 (FIG. 1A and FIG. 1D) disables the issuance of another SYNC DET 46 pulse until after RGATE has been negated.

Byte clock generator (byte clock) 392 (FIG. 7) is a modulo n counter that is enabled by the assertion of RGATE and SYNC DET 46 (FIG. 7); n is equal to the channel codeword bit length. The assertion of SYNC DET 46 indicates that shift register 404 contains a valid sync code, and that the next n bits shifted into shift register 404 will be a complete n-bit codeword which is also called a "data frame." Upon being enabled, byte clock 392 counts read clock 272 pulses (or cycles) and, upon receiving the n-th pulse in read clock 272, issues a pulse in NRZ read clock 148. NRZ read clock 148 is conveyed to RLL decoder 391 and to HIDC 32 via Port 40 (FIG. 4). The issuance of a pulse in NRZ read clock 148 indicates that parallel data 381 are presenting a complete data frame to RLL decoder 391. Once enabled, byte clock 392 continues to count data clock pulses and issue NRZ read clock 148 pulses until RGATE is negated.

RLL decoder 391 (FIG. 7) translates codewords presented as parallel data 381 into NRZ data in accordance with the data code employed by the disk drive. The preferred code is an 8/9, d=0 code where the denominator 9 is the codeword length n. The preferred code is an 8/9 code in that the ratio of the number of data bits generated by RLL decoder 391 for each channel codeword received as parallel data 381 is 8/9, i.e., RLL decoder 391 generates an 8 bit output word for every 9 bits of serial data it receives as input. Any of a variety of other codes taught in the prior art may also be employed. While RGATE is asserted, RLL decoder 391 continuously accepts codewords from parallel data 391, translates the codewords into NRZ data words, and presents the NRZ data words on internal NRZ data bus 144. For preferred implementation, the NRZ data word is an 8-bit byte.

The circuits illustrated in FIG. 7 include means for indicating that detected data signal 366 are data recovered from TRK ID 78 (FIG. 3A) and redundant TRK ID 79 (FIG. 3A). This TRK ID indicator means includes counter 396, TRK ID parameter register 389 and control circuitry in channel control logic 43 (FIG. 4) that provides parameter select signal 266. TRK ID length parameter register 389 is a read parameter register 130 (FIG. 1D) that stores the TRK ID length parameter which is output as TRK ID length 394 which is conveyed to counter 396 inputs. Preferably, TRK ID length 394 is the combined length in bits of the TRK ID 78 and optional redundant TRK ID 79. Microprocessor 34 loads register 389. Parameter select signal 275 is asserted when data recovered from a servo track segment 68 (FIG. 3A) are to be processed by shared pattern detector 380 and RLL decoder 391. When all of parameter select signal 275, RGATE and SYNC DET 46 are asserted, counter 396 asserts control signal TRK ID select (select) 393 and begins counting read clock 272 pulses. Select 393 is conveyed to an RLL decoder 391 control input and indicates that data recovered from a TRK ID 78 or redundant TRK ID 79 are to be translated. Counter 396 counts until the count value matches the value presented TRK ID length 394; when a match occurs, select 393 is negated and counter 396 becomes inactive until another TRK ID 78 is to be recovered. The construction and operation of circuitry for implementing counter 396 and the control signal TRK ID select 393 are taught in the prior art.

In an alternate embodiment of the TRK ID indicator means, the TRK ID length 394 parameter is measured in data frames and NRZ read clock 148 is input to counter 396 rather than read clock 272. In this embodiment, counter 396 counts data frames until all codewords recovered from TRK ID 78 and redundant TRK ID 79 have been translated by RLL decoder 391.

As noted above, microprocessor 34 may load SREG 384 with the SSM sync code and DREG 386 with the DSM sync code used in SSM 76 (FIG. 3A) and DSM 100 (FIG. 3B), respectively. These means for programmably changing the contents of SREG 384 and DREG 386 permits SSM 76 and DSM 100 bit patterns to be optimized for the specific disk drive design. In addition, these means permit using different SSM sync codes and DSM sync codes in any servo zone band, $S_i$ (FIG. 2B), or data zone band, $D_i$ (FIG. 2B), respectively.

RLL decoder 391 (FIG. 8B) includes in-register 373, translator 383, out-register 349, state preset data 369, state preset servo 371, and MUX 379. Data recovered from TRK ID 78 and 79 employ Gray codewords and the data recovered from data sectors 92, SSA 80, redundant SSA 82, CRC 84 and redundant CRC 85 employ user-data codewords, consequently, Gray codewords are translation differs from the more conventional user-data codeword translation, and RLL decoder 391 provides shared means for decoding Gray codewords and user-data codewords. The reasons for using different codewords for TRK ID 78 and 79 are discussed below. RLL decoder 391 (FIG. 8B) receives codewords from parallel data 381 and stores them in-register 373 while they are translated by translator 383. Translator 383 generates translated output as NRZ data that are stored in out-register 349; out-register 349 outputs are connected to internal NRZ data bus 144 providing means for conveying NRZ data to Port 40 (FIG. 4). Both in-register 373 and out-register 349 loading is synchronized by NRZ read clock 148.

Translator 383 may be implemented using ROM, a programmable logic array (PLA), or any other suitable combination of logic and memory circuitry that provides the required codeword to NRZ data word conversion. Preferably, translator 383 is reconfigurable so that it may accommodate translation of both Gray codewords and user codewords, and is design optimized to have translation time that is less than the maximum allowed translation time while using the smallest possible silicon area. Preferably, translator 383 is implemented by a combination of tables and combinatorial logic.

Figure 8A:
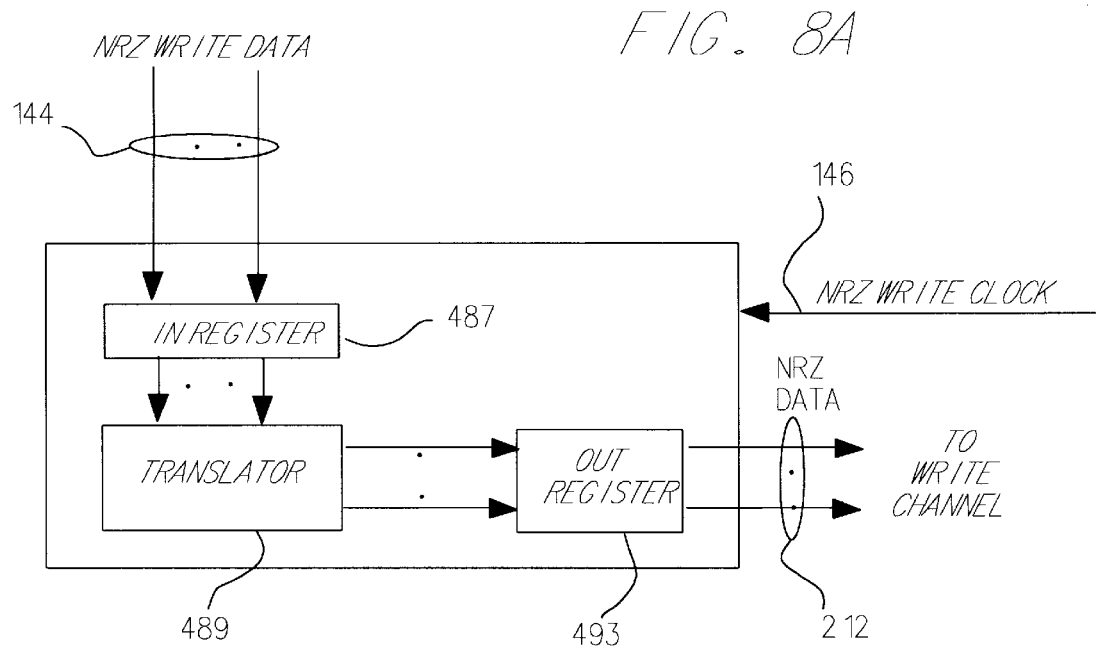
FIG. 8A is a block diagram of a suitable implementation of circuitry in the write path of ENDEC circuit 246 of FIG. 5.
Figure 8B:
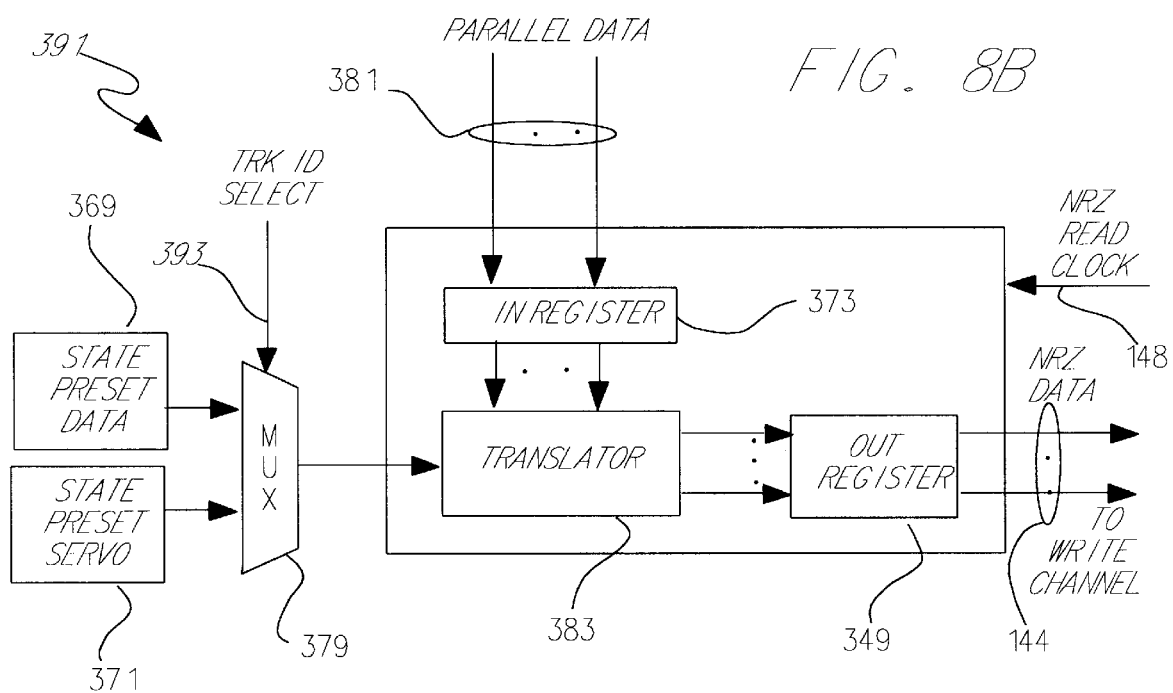
FIG. 8B is a block diagram of a suitable implementation of RLL decoder 391 of FIG. 7.

Translator 383 as illustrated in FIG. 8B employs state preset information provided from data state preset storage 369 and servo state preset storage 371 to affect the nature of codeword translation. Both state preset storage 369 and 371 are a set of logic values which, when coupled to translator 383, alter the function of translator 383 to meet the different requirements for translating Gray codewords and user-data codewords. The outputs from state preset storage 369 and 371 are input to MUX 379 which in turn conveys the selected preset information to translator 383 control inputs. The control signal TRK ID select 393, when asserted, selects state preset servo 371 and, when negated, selects state preset data 369.

As noted above in the discussion of FIG. 3A, both TRK ID 78 and redundant TRK ID 79 are Gray code bit patterns written so that patterns in radially adjacent servo track segments 68 differ by only one bit and are phase coherent. In addition, TRK ID 78 and 79 are desirably defined so they may be quickly translated to an integer value that reflects the position of the track they were recovered from relative to a reference track or fixed radial location. For example, the radially outer most user-data track, often called track zero, is a preferred reference track. The head-positioning servo system uses the translated track number to determine the radial position, velocity and acceleration for the selected transducer 20 (FIG. 1A) during track-seeking operations. Finally, it is desirable that the Gray codes be selected so that the TRK ID 78 and 79 are not prone to read errors and have the shortest possible bit length. The selection of Gray code sequences that satisfy these requirements would be severely restricted if the Gray codes must further be translatable by the same translation rules applied to user data. Preferred embodiments employ TRK ID 78 and 79 written using a rate 1/3 coding scheme.

WRITE PATH ENCODING

Referring to FIG. 8A, the write data path of ENDEC circuit 246 (FIG. 5) includes in-register 487, translator 489, and out-register 493. During data write operations, HIDC 32 provides NRZ write data to ENDEC circuit 246 (FIG. 5) via the bi-directional channel data bus 38 (FIG. 1D), Port 40 (FIG. 4) and internal NRZ data bus 144 (FIG. 4 and FIG. 8A). In-register 487 receives NRZ data presented on data bus 144 and stores the data while the data are translated into codewords by translator 489. Translator 489 outputs are conveyed to out-register 493 inputs. Out-register 493 stores the codewords while out-register outputs 493 contents are conveyed to write channel 210 (FIG. 4) via channel write data bus 212 (FIG. 8A and FIG. 4). Write channel operation is as discussed above with reference to FIG. 4. NRZ write clock 146 is provided by Port 40 as described above with reference to FIG. 4.

Translator 489 may be implemented using ROM, a programmable logic array (PLA), or any other suitable combination of logic and memory circuitry that provides the required NRZ data word to codeword translation.

During disk drive write data operations, internal NRZ data bus 144 (FIG. 4), Port 40, and channel data bus 38 are shared on a time multiplexed basis between conveying NRZ data recovered from servo track segments 68 (FIG. 3A) to HIDC 32 and conveying user data from HIDC 32 to read channel 200. Similarly, timing recovery circuit 244 (FIG. 5) provide both the data clock 242 used to recover data from servo track segments 68 (FIG. 3A) and write clock 102 used to write data sectors 92 (FIG. 3B). The basis for sharing timing recovery between read and write operations is discussed with reference to FIG. 11A, FIG. 11B and FIG. 11C.

STRUCTURE OF SHARED PATTERN DETECTOR

Referring to FIG. 9A, shared pattern detector 380 includes a detector 400, a threshold register ("TREG 495"), and shift register 404. Detector 400 includes an exclusive-OR-NOT (EORN) array 406 and i-of-m summer-comparator 410. EORN array 406 includes m individual gates EORN 406-i for i=1, 2, . . . m. Each EORN-i output is asserted when both of its inputs are in the same state, i.e., both are either asserted or negated. Shift register 404 is m or more bits in length and receives detected data signal 366. Detected data signal 366 include data recovered from servo track segments 68 and data sectors 92 and, consequently, include serial data recovered from PLL 74, SSM 76 (FIG. 3A), PLL 98 and DSM 100 (FIG. 3B). Preferably, the patterns used for SSM 76 and DSM 100 are not identical.

The functions performed by shared pattern detector 380 as illustrated in FIG. 9A are generally discussed with reference to FIG. 7. The operation of detector 400 will now be described. Prior to initiating data recovery operations, microprocessor 34 loads TREG 495 with a threshold parameter i via register bus 126, microprocessor port 120 (FIG. 4), and microprocessor bus 36 (FIG. 4). Threshold register (TREG) 495 output as sync mark (SM) threshold 497 is input to summer-comparator 410; SM threshold 497 represents the SM detect threshold i.

During data recovery, detected sample data signal 366 are shifted into and through shift register 404, and shift register 404 outputs as parallel data 381 are presented to one set of EORN array 406 inputs; sync code 402 is input to the other set of EORN array 406 inputs. The output from EORN array 406 is match data 408 where individual bits are match data 408-i for i=1, 2, . . . m. EORN array 408 outputs are input to i-of-m summer-comparator 410 which generates a sync detect 46 pulse when the number of asserted match data 408-i is greater than SM threshold 497, i. Shift register 404 and summer-comparator 410 are clocked by read clock 272 pulses phased so that match data 408 are not clocked while the contents of shift register 404 are changing. Preferred implementations of i-of-m summer-comparator 410 employ conventional CMOS circuit logic.

In normal operation, RGATE is asserted to i-of-m summer-comparator 410 only when data recovered from PLL 74 and SSM 76 (FIG. 3A) or PLL 98 and DSM 100 (FIG. 3B) is in shift register 404, and i-of-m summer-comparator 410 only issues a sync detect 46 pulse when parallel data 381 contains data recovered from PLL 74 and SSM 76 or PLL 98 and DSM 100 and these recovered data are properly aligned with sync code 402. However, because data bits recovered from PLL 74 and SSM 76 or PLL 98 and DSM 100 are error-prone bits, a risk arises that one of two kinds of pattern detection errors may occur. One such kind of detection error is a failure to detect; this occurs when too few match data-i 408-i are asserted when the data recovered from PLL 74 and SSM 76 or PLL 98 and DSM 100 are properly aligned with sync code 402; in this case, a sync detect 46 pulse is not issued, the byte clock generator 392 (FIG. 7) and read data are not conveyed to HIDC 32 (FIG. 4). The second such kind of detection error is a misdetection; this occurs when the pattern of error bits is such that a false match occurs before the data bits recovered from PLL 74 and SSM 76 or PLL 98 and DSM 100 are shifted into proper alignment with sync code 402; in this case, data will not be framed correctly to the end that invalid data are conveyed to HIDC 32 and a check sum error occurs.

Shift register 404 must be m or more bits in length in order to ensure that it can store an entire sync code 402, and that shift register 404 must be n or more bits in length in order to ensure that it can store and entire data RLL codeword. The bit length of SSM 76 (FIG. 3A), DSM 100 (FIG. 3B) and a user-data codeword may have the same or different bit lengths. For implementations that use different bit lengths for these track elements, the shift register 404 bit length must be equal to or larger than the longest of these elements.

The SSM 76 (FIG. 3A) and DSM 100 (FIG. 3B) codes and the summer threshold parameter i are chosen so that when sync detect 46 is asserted, there is acceptable probability that a real sync mark (SSM 76 or DSM 100) has been detected despite m-i sync mark bits having been read in error. In a preferred implementation, n, the RLL codeword is 9 bits long, SSM 76 and DSM 100 are 36 bits long, and i is 32 bits. In this embodiment, summer-comparator 410 issues a sync detect 46 pulse only when 33 or more match data 408-i are asserted. The selection of sync code and i parameter value depends to a great extent upon disk drive design specifications such as expected raw channel read error rate and maximum acceptable SSM 76 detection error rate. Depending upon these specifications, preferred embodiments may use sync codes that employ more or fewer bits and smaller or larger i parameter values. A discussion of the methods used to select robust sync codes follows.

Suitable sync mark codes (bit patterns) may be found by simulating the comparison of candidate sync mark codes against a shifting sequence of data bits consisting of PLL 74 (FIG. 3A) or PLL 98 (FIG. 3B) data bits followed by the candidate sync code data bits, i.e., a simulation of detector 400 operation. During this simulation, the Hamming distance (i.e., the number of bits that differ between the bit patterns being compared) may be measured and noted for each shift position; the smallest value noted for any position except the aligned position is the minimum Hamming distance d for the candidate code. The Hamming distance at the aligned position will be zero. Sync codes having the largest minimum Hamming distance, d, are most desirable since the larger this distance, the better the error bit rejection of the sync mark bit pattern. For a given sync mark code having minimum Hamming distance d, each error bit injected into the shifting pattern reduces the minimum Hamming distance observed for misaligned positions by one and increases the Hamming distance observed at the aligned position by one, provided that any error that occurs does so in the sync field. Thus, the detection error margin decreases by two for each error bit in the shifting pattern. The error rejection of a sync mark bit pattern is (at least) $(d-1)/2$ where d is the minimum Hamming distance as measured above. A large number of suitable sync mark bit patterns following these constraints may be obtained.

For example, for a sync code having a length of m =36 bits and a minimum Hamming distance of d=9, the error rejection is $r=((9-1)/2)=4$ error bits, and the threshold parameter i must be selected to be equal to or greater than m −4. The probability of a failure to detect increases, and the probability of a misdetection decreases, as i is increased toward the value of m.

Figure 9B:
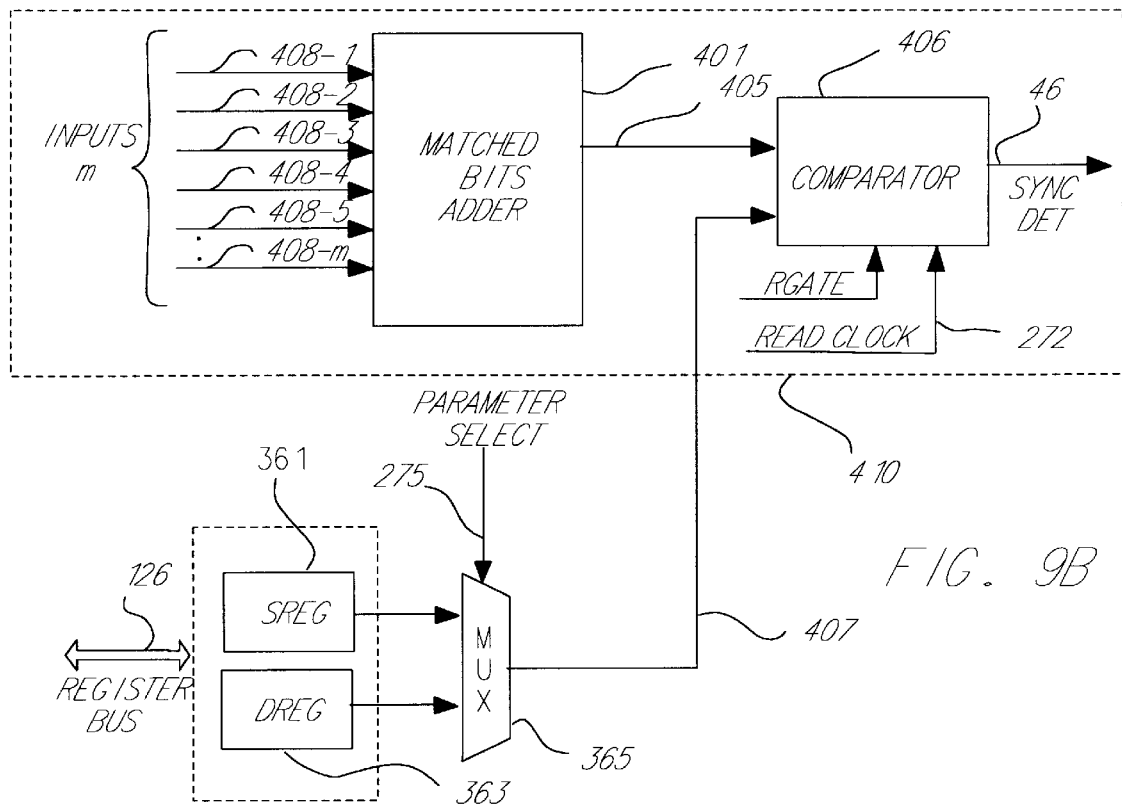
FIG. 9B is a block diagram of an embodiment of an i-of-m comparator 410 that employs a digital bit summing circuit and is suitable for use in shared pattern detector 380 of FIG. 7.

FIG. 9B illustrates a preferred embodiment of detector 400 and associated parameter switching means. Detector 400 includes an matched bit adder 401 and digital comparator 406. A multiplexor means ("MUX 365") operates under control of parameter select signal 275 to provide a parameter switching means for conveying a selected parameter from SREG 361 and DREG 363 to control comparator 406.

SREG 361 and DREG 363 store acceptance thresholds for SSM 76 (FIG. 3A) and DSM 100 (FIG. 3B). Prior to initiating data recovery operations, microprocessor 34 loads SREG 361 and DREG 363 with suitable acceptance threshold parameters i via register bus 126, microprocessor port 120 (FIG. 4), and microprocessor bus 36 (FIG. 4). The output of SREG 361 and DREG 363 are conveyed to MUX 365 inputs. Parameter select signal 275 causes MUX 365 to convey the parameter stored in SREG 361 when shared pattern detector 380 (FIG. 9A) is to search for a SSM 76 and causes MUX 365 to convey the parameter stored in DREG 363 when shared pattern detector 380 is to search for a DSM 100. MUX 365 outputs as digital threshold 407 are conveyed to one set of comparator 406 inputs.

Matched bit adder 401 receives m inputs from match data 408 (FIG. 9A) and generates digital sum 405 which is conveyed to the another set of digital comparator 406 inputs. Adder 401 includes conventional logic circuitry that generates digital sum 405 which is a count of the number match data-i signals that are asserted. Comparator 406 compares digital sum 405 with analog threshold 407 and if sum 405 is greater than threshold 407 and RGATE 210 is asserted, comparator 406 gates a read clock 272 pulse to SYNC DET 46.

The parameter switching means provide for employing different detection threshold levels for sync codes recovered from SSM 76 (FIG. 3A) and DSM 100 (FIG. 3B) and thereby provide means for sharing detector 400 in detecting both SSM 76 and DSM 100. This facilitates use of sync codes in SSM 76 (FIG. 3A) and DSM 100 (FIG. 3B) that are optimized to reduce misdetection probabilities while minimizing the disk 14 surface area employed to record sync codes. A fixed threshold may be employed for all servo zone bands and data zone bands, or thresholds may be varied on a zone by zone basis by microprocessor 34 as means to compensate for variations in magnetic media, transducers, and other parameters which that adversely affect the sync code robustness (detection reliability).

Figure 9C:
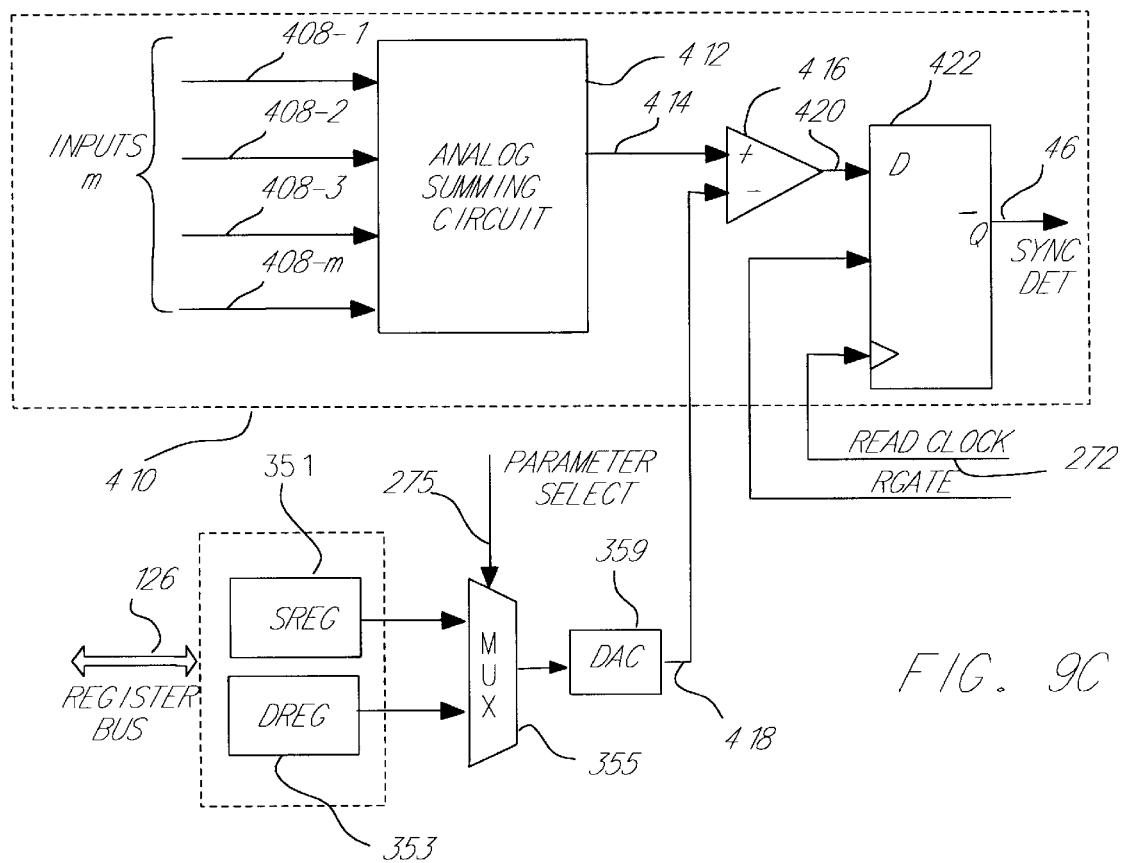
FIG. 9C is a block diagram of an embodiment of an i-of-m comparator 410 that employs an analog summing circuit and is suitable for use in the shared pattern detector 380 of FIG. 7.

FIG. 9C illustrates an alternate embodiment of detector 400 and parameter switching means for detector 400. Detector 400 includes an analog summing circuit 412, analog comparator 416, sync detect flip flop 422 and SM detector digital to analog converter ("DAC 359"). The parameter switching means includes a multiplexor means ("MUX 355") that operates under control of parameter select signal 275 to convey a selected parameter from SREG 351 or DREG register 353. SREG 351 and DREG 353 store acceptance thresholds for SSM 76 (FIG. 3A) and DSM 100 (FIG. 3B), respectively. Prior to initiating data recovery operations, microprocessor 34 loads SREG 351 and DREG 353 with suitable acceptance threshold parameters i via register bus 126, microprocessor port 120 (FIG. 4), and microprocessor bus 36 (FIG. 4). The output of SREG 351 and DREG 353 are conveyed to MUX 355 inputs. Parameter select signal 275 gates SREG 351 to MUX 355 outputs when shared pattern detector 380 is to search for a SSM 76 and gates DREG 353 to MUX 355 outputs when shared pattern detector 380 is to search for a DSM 100. The MUX outputs are conveyed to DAC 359 inputs, and DAC 359 converts the selected threshold to SM analog detection threshold 418 which is conveyed to the minus (−) input of comparator 416. SM analog detection threshold 418 is analog voltage proportional to the contents of the selected register SREG 351 or DREG 353.

Analog summing circuit 412 receives m inputs from match data 408 (FIG. 9A) and generates analog sum 414 which is an analog signal having amplitude corresponding to the count of the number of bits in match data 408 that are asserted; sum 414 is conveyed to the plus (+) input of comparator 416. Circuits 412 and 416 may be of any suitable design. For example, analog summing circuit 412 may be composed of a set of resistors that couple match data 408 to a summing node thereby providing a voltage value on line 414 corresponding to the sum of match data-i, and analog comparator 416 may be any voltage comparator having sufficient resolution to meet circuit requirements.

Comparator 416 compares analog sum 414 with analog threshold 418 and if sum 414 is greater than threshold 418, asserts sync mark (SM) enable 420 which is input to sync detect flipflop 422. Sync detect flipflop 422 is a D form flip flop that is clocked by a read clock 272 signal phased to sample the state of SM enable 420 after match data 408 has achieved a stable state. Sync detect flipflop 422 is set (turned on) if both RGATE 210 and SM enable 420 are asserted when flipflop 422 is clocked. Since the true output (Q) of sync detect flipflop 422 is source for sync detect 46, sync detect 46 is asserted when flipflop 422 is set.

FIG. 9C illustrates a simple way to implement an i-of-m comparator 410 by combining analog and digital circuitry. A variety of modifications to the illustrated analog implementation of such an i-of-m comparator may be employed; for example, current summing and current thresholds may be employed in place of voltage summing and current thresholds.

CONTROL FLOW

Figure 11A:
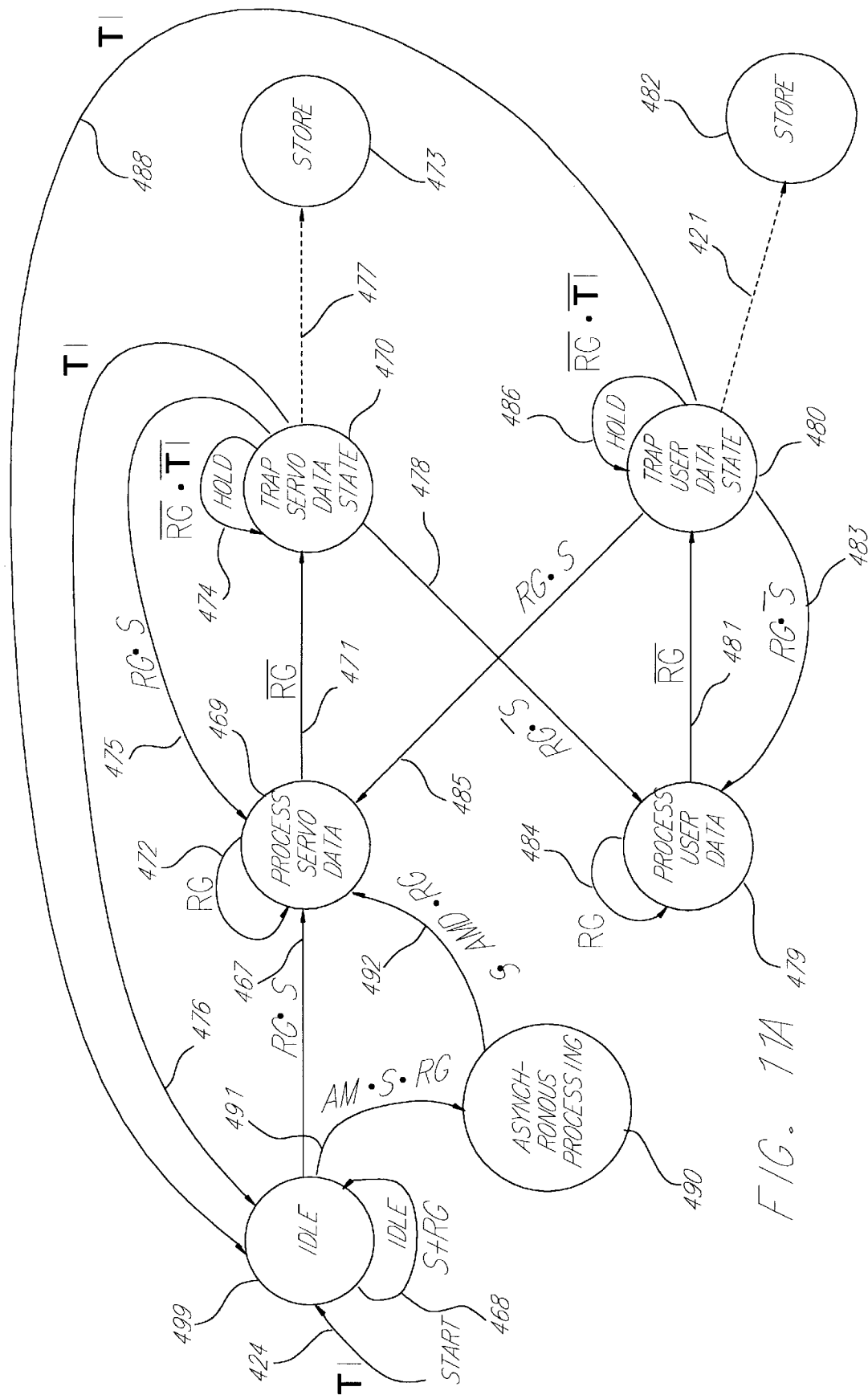
FIG. 11A is a state diagram of the state trapping control flow for channel 26 of FIG. 1D.

Referring to FIG. 11A, the flow of control of read channel 200 while it processes servo ID groups 71b and data sectors 92 is shown as a set of control states and transitions between control states. The control states are illustrated by circles, and transitions between control states are illustrated by connecting arrows labeled with the control signals that enable the transition.

The control states include an idle state 499, a process servo data state 469, a trap servo data state 470, a first store state 473, an asynchronous processing state 490, a process user state 479, a trap user data state 480, and a second store state 482. The transition-initiating control signals are the PARAMETER SELECT, RGATE, AM ENABLE, and AM DET signals discussed above, and a μP INIT control signal applicable to transitions initiated by microprocessor 34. The symbols used in FIG. 11A to refer to these control signals, when asserted, are shown in Table 2 below. In FIG. 11A, a bar above the symbol indicates that the signal is not asserted, and the logical AND (*) and OR (+) symbols are used in conventional manner.

TABLE 2

| CONTROL SIGNAL | SYMBOL |
| --- | --- |
| PARAMETER SELECT | S |
| RGATE | RG |
| μP INIT | μI |
| AM ENABLE | AM |
| AM DET | AMD |

The control flow of the read channel operation begins with initialization of read channel 200 as illustrated by the START transition 424 that leads into to idle state 499. Start transition 424 occurs during disk drive start up as consequence of a power on reset (POR). A POR is a control event that occurs as consequence of bringing up the disk power supplies or as consequence of an operational exception such as an operator of the host depressing a master reset switch. Read channel 200 remains in idle state 499 while microprocessor 34 initializes the contents of memory (registers) in channel 26 and other ICs including HIDC 32. Microprocessor 34 activates read channel 200 by issuing read commands to HIDC 32.

Microprocessor 34 performs an initialization procedure in accordance with an initialization control program that is executed as a consequence of POR being asserted then negated. While POR is asserted, the following events are occur: (a) the disk drive power supplies reach the correct, stable operating voltage; (b) the disk drive clock signal source is started and reaches a stable operating mode; and (c) integrated circuits subject to the transient effects of POR signal assertion are initialized to a predefined operational state which is idle state 499. Preferably, power supply monitoring circuits maintain POR in the asserted state so long as power supply voltages are outside specified limits.

When the POR signal is negated, all IC's in the disk drive except microprocessor 34 become operational in an idle mode and microprocessor 34 begins executing instructions at a reset instruction address that is embedded in microprocessor 34; the instruction in the reset instruction address passes program control to the initialization control program. The initialization program is stored in ROM that may be included in either or both of microprocessor 34 or ROM 54. The initialization program performs an initialization procedure that first establishes that the disk drive electronics are functional and then initializes the disk drive to prepare the disk drive to respond to commands issued by the host via host interface port 33.

A preferred initialization procedure first executes several test programs that verify that disk drive electronics are functioning correctly. Usually, the first step in this procedure is the execution of microprocessor 34 test programs. Regardless of order, the preferred procedures include test procedures that verify that the following ICs illustrated in FIG. 1D function correctly: microprocessor 34, ROM 54, RAM 60, data buffer 42, and HIDC 32. If no fault is identified by the test procedures, the initialization procedure loads registers in the various IC's on PCBA 12 with start-up parameters acquired from ROM 54 or microprocessor 34 embedded ROM. This parameter loading process includes initialization of channel 26 by loading channel start up parameters into register set 122; the affected registers include any of the parameters registers and writeable state trap registers discussed above that are included in register set 122 and may include CPM 215 configuration and control registers. Read channel 200 remains in idle state 499 while microprocessor 34 initializes read channel 200 register set 122. Upon completion of the initialization procedure, read channel 200 is operationally ready, but remains in idle state 499 as indicated by idle transition 468.

The next initialization procedure step affects the spin up of spindle motor 16 which includes initialization of parameters for spindle motor driver circuit 56. Once spindle motor 16 reaches the desired, stable angular velocity, the initialization procedure activates servo initialization and calibration programs that: move transducers 20 out of the latched position and over disk 14 surface having valid recorded servo zone bands, Si, and data zone bands, Di, searches for and finds a SAM 72; read a first servo ID group 71$b$ by searching for and finding a SSM 76 which defines the arrival time of servo track segments 68 and causes timers in HIDC 32 to become synchronized with servo track segment 68 arrival times; read several additional servo ID groups 71$b$ and use the data so recovered to determine transducer radial position and velocity; seek to a preferred disk track; and achieve a stable track-following condition over the preferred disk track. Subsequently, head-positioning servo calibration programs perform a series of seek and track follow operations during which head-positioning servo performance data are acquired and used to generate head-positioning servo calibration parameters that are stored in channel parameter memory as part of the channel parameter data. These servo calibration parameters are used in calculations performed during subsequent servo operations.

The disk drive initialization procedures outlined in the preceding paragraph use channel 26 as means to process servo track segments 68. While doing so, read channel 200 operates in several of the control states illustrated in FIG. 11A. Although not all of the state transitions are illustrated in FIG. 11A for clarity, microprocessor 34 may intervene and force read channel 200 back to idle state 499 by means of μP INIT while read channel 200 is operating in any of the control states illustrated in FIG. 11A. For example, a SAM 72 search is initiated control passes from idle state 499 via transition 491 to asynchronous processing state 490. Read channel 200 remains in state 490 until a SAM 72 is identified or until microprocessor 34 intervenes and forces read channel 200 back to idle state 499 by means of mP INIT (microprocessor interrupt). The latter may occur as consequence of unsuccessful search for SAM and an associated initialization procedure watchdog timer timeout.

The SAM search and detection process is described above in the discussion of FIG. 3A and FIG. 6. Upon detection of a SAM 72, read channel 200 asserts AM DET 47 and leaves state 490 via transition 492 and enters state 469. While in state 469, read channel 200 processes data recovered from the servo ID group 71$b$ following the detected SAM 72. This processing includes a search for SSM 76. When SSM 76 is detected, byte clock generator 392 is activated which frames the data in servo ID group 71b, a sync detect (SYNC DET) 46 signal (such as a pulse or alternatively a particular word conveyed via bus 38 ) is conveyed to HIDC 32, as consequence of receiving sync detect 46, HIDC 32 synchronizes the servo timers control used to predict the arrival of subsequent servo track segments 68, and read channel 200 processes the remaining track elements in servo track segment 68 and conveys the recovered data to HIDC 32 via Port 40 and channel data bus 38.

After receiving the data recovered from the servo track segment 68, HIDC 32 negates RGATE which causes read channel 200 exit state 469 via transition 471 to state 470. Entry into control state 470 causes various state trap registers 118 to trap state variables. Read channel 200 remains in state 470 as indicated by transition 474 until conditions for one of the other state 470 exit transitions are satisfied. In normal operation, HIDC 32 will initiate transition 475 to state 469 when the arrival of the next servo ID group 71b is imminent. Processing of the next servo ID group 71b is similar to the first and, when completed, transition 471 is traversed back to state 470 and state trapping is repeated. Processing of servo ID groups 71b and the associated transition from state 470 to state 469 and back to state 470 occurs upon arrival of each successive servo ID group 71b, and is an ongoing process that is background to the head-positioning servo initialization and calibration procedures discussed in a preceding paragraph and to the disk drive initialization procedures described in the following paragraphs. At each entry into state 469, trapped state variables stored in state trap registers are restored to the associated operating registers prior to beginning recovered data processing. None of the initialization procedures described to this point in the discussion of FIG. 11A requires the use of read or write operations on data sectors 92 (FIG. 3B).

Upon completing the head-positioning servo calibration process, disk drive data recovery means recover configuration data from reserved disk drive cylinders and store these data in channel parameter memory. These means causes the disk drive to seek to and recover configuration data and possibly control programs for microprocessor 34 from reserved disk tracks which are preferably included in reserved disk drive cylinders, and they cause the configuration data to be stored in channel parameter memory as channel parameter data. The data recovery means comprise the selected transducer 20, preamplifier 22, channel 26, HIDC 32, microprocessor 34, microprocessor control programs residing in either or both of microprocessor 34 or ROM 54, and servo electronics.

The physical location of the reserved tracks (cylinders) are embedded in disk drive control programs that reside in ROM and, consequently, these tracks (cylinders) must be at the same location for any disk drive that uses the control programs. The reserved tracks (cylinders) are not included in the disk storage used to characterize the disk drive storage capacity available to the end user, and the end user cannot access the reserved tracks (cylinders) by using the disk drive commands or command sequences normally used to access user data. Rather, accessing the reserved tracks (cylinders) requires the use of disk drive commands and utilities programs designed specifically for accessing and updating these data.

As the configuration data are recovered from data sectors 92 in reserved tracks, the data are loaded into data buffer 42 by HIDC 32 on a data sector 92 by data sector 92 basis upon arrival from channel 26. As these data become available to microprocessor 34, microprocessor 34 recovers these data from data buffer 42 and uses these data to initialize the various IC 500 in PCBA 12. When part or all of the channel parameter memory is in microprocessor 34 registers or RAM 60, some or all of the configuration data may be moved from buffer 42 into microprocessor 34 registers or RAM 60.

The initialization procedures outlined in the preceding paragraph uses channel 26 as means to process data recovered from data sectors 92. While doing so, read channel 200 operates in several additional control states not previously discussed. HIDC 32 initiates read channel data sector 92 read operations by causing read channel 32 to exit state 470 via transition 478 to enter state 479. Transition 478 occurs when the beginning of a target data sector arrives at the selected transducer 20. In normal operation, transition 479 occurs while an AGC 95 is under the selected transducer 20. While in state 479, read channel searches for and find the DSM 100 at the beginning of the target data sector 92. When DSM 100 is detected, byte clock generator 392 (FIG. 7) is activated which frames the user data, a sync detect (SYNC DET) 46 signal is conveyed to HIDC 32, and, as consequence of receiving sync detect 46, HIDC 32 prepares to receive data. Subsequently, read channel 200 processes the remaining track elements in data sector 92, conveys the recovered data to HIDC 32 via Port 40 and channel data bus 38, and HIDC 32 stores the data in data buffer 42.

After all required data have been recovered from the target data sector and while the selected transducer 20 is over pad 106 (FIG. 3B), HIDC 32 causes read channel 200 to leave state 479 via transition 481 and enter state 480; upon entry into state 480 read channel 200 stores data state variables in data state trap registers or data state trap circuit. Read channel 200 idles in state 480 as indicated by transition 486 until HIDC 32 or microprocessor 34 forces transition to some other state. Often, the initialization procedure will require that read channel 200 process the next sequential data sector 92, this sequence being illustrated in FIG. 3B by time sequential data sectors 92a and 92b. When such occurs, read channel 200 leaves state 480 via transition 483 and enters state 479 while AGC 96b is under the selected transducer whereupon read channel 200 processes data sector 92b in the same manner as the previous data sector 92a. The sequential processing of data sectors 92 and transition from states 480 to state 479 and back to state 480 occurs until, as illustrated in FIG. 3B, a servo-data segment 68b follows a data sector 92b. When this occurs, HIDC 32 causes read channel 200 to leave state 480 via transition 485 and enter state 469. While in state 469, read channel 200 processes a servo ID group 71b then leaves state 469 via transition 471 to enter state 470. It may be necessary for read channel to process a data sector 90 immediately after processing a information in a servo track segment 68 the sequence being illustrated in FIG. 3B by the servo track segment 68a and data sector 92a. When such processing is required, read channel 200 leaves state 470 via transition 478 and enters state 479 whereupon data sector 92a is processed and read channel leaves state 479 via transition 481 to enter state 480.

Read channel 200 stores servo state variables in servo state trap registers or servo state trap circuits upon each entry into state 470. Similarly, upon each entry into state 480 read channel 200 stores data state variables in data state trap registers or data state trap circuits. Also, each time read channel 200 enters state 469 via transition 475 or transition 485, trapped servo state variables are restored to read channel operating registers. Also, each time read channel 200 enters state 479 via transition 478 or transition 483, trapped data state variables are restored to read channel operating registers.

The initialization procedure is complete when all configuration data have been recovered from reserved tracks, the recovered configuration data have been used to initialize the disk drive including channel 26 and the disk drive completes a track-seeking operation to a start cylinder. Upon completing the initialization procedure, the disk drive is operational and ready to execute commands issued by the attached host.

During track-seeking operations, data sectors 92 are not processed and read channel 200 processes servo ID groups 71b exclusively. During such operations, read channel 200 traverses the state-transition sequence 470-475-469-471-470 repeatedly until such time that the target disk track is reached or until the head-positioning servo predicts that a servo zone boundary 63 (FIG. 2C) is to be traversed. When a servo zone boundary is to be traversed, microprocessor 34 causes read channel 200 transition from state 470 via transition 476 to state 499, and while read channel idles in state 499, microprocessor 34 initializes read channel with parameters suitable for the servo zone band, Si, (FIG. 2B) entered. The initialization procedure is completed before the next sequential servo track segment 68 arrives at the selected transducer 20, and, when the servo track segment 68 does arrive, HIDC 32 causes read channel 200 to exit state 499 via transition 467 and enter state 469.

Similar read channel 200 control flow occurs during disk drive user-data read operations. While reading user-data sectors 92, read channel 200 follows control flow similar to the following: S470-T475-S469-T471-S470-T478-S479-T481-S480-T483-S479-T481-S480-T483-S4 79-T481-S480-T485-S469-T471-S470----. During the foregoing sequence read channel 200 processes in order a servo ID group 71b, three data sectors 92, and a servo ID group 71b.

FIG. 11B presents a timing diagram that illustrates processing of a portion of a data track segment that includes two servo track segments 68 separated by three data sectors 92. For clarity, a partial data sector 501 precedes the first servo track segment 502 and a partial data sector 507 follows the second servo track segment 506. Data sectors 503, 504 and 505 follow, in order, the first servo track segment 502.

Although the illustrated layout includes three complete data sectors 503, 504 and 505 between servo track segments 502 and 506, this illustrates only one of many possible track configurations that might exist in the various zone bands in a single disk drive. Use of a single data between servo track segments 502 and 506 or use of some number of complete data sectors and some number of partial data sectors between servo track segments 502 and 506 is also permitted by preferred disk drive designs.

As illustrated in FIG. 11B, servo track segments 502 and 506 are divided into two parts, the first part labeled process servo data corresponds to a servo ID group 71b (FIG. 3A) and the second part labeled process servo bursts corresponds to servo bursts group 71c (FIG. 3A). Also as illustrated in FIG. 11B, the control signals SGATE, RGATE and BGATE are asserted when traced high and are negated when traced low. Pads 508 are read-read timing pads described in detail with respect to FIGS. 3A and 3B. SGATE, RGATE and BGATE are control signals input to channel 26 as members of timing and control signals 44.

The RGATE signal is conveyed from HIDC 32 to channel 26 among timing and control signals 44 and enables assertion of read gate (RGATE) signals, and discussed above that are internal control signals of channel 26.

The assertion of SGATE by HIDC 32 indicates to read channel 200 that any read operation to follow will process a servo ID group 71b (FIG. 3A). Such processing is initiated when HIDC 32 asserts RGATE and continues only while RGATE remains asserted. The assertion of SGATE causes control circuits in channel control logic 43 (FIG. 4) to enable the assertion of those control signals in parameter select signals 262, 266, 270, and 275 that select servo parameter registers and servo state trap registers. The actual assertion times of parameter select signals 262, 266, 270, and 275 are precisely controlled and coordinated with RGATE assertion and negation times by HIDC 32 and channel 26 timing circuits so as to ensure reliable read channel 200 operation. In some cases, such timers may be implemented as simple logic delay circuits.

The assertion of RGATE while SGATE is negated initiates reading of a data sector 503, 504 or 505. Similarly, the negation of SGATE causes control circuits in channel control logic 43 (FIG. 4) to enable the assertion of those control signals in parameter select signals 262, 266, 270, and 275 that select data parameter registers and data state trap registers. Again, the transitions in parameter select signals 262, 266, 270, and 275, are precisely controlled and coordinated with RGATE assertion and negation times.

The assertion of BGATE while SGATE is already asserted, activates servo burst processing means 230 (FIG. 5) to process servo bursts 86 (FIG. 3A). Again, BGATE assertion and negation times are precisely controlled by timing circuits in HIDC 32 and channel 26.

When neither RGATE or BGATE is asserted, the read channel, although active, is not processing servo track segments 68 (FIG. 3A) or data sectors 92 (FIG. 3A). This state of the read channel operation is illustrated in FIG. 11B as an idle period following servo track segments 502 and 506 and following data sectors 501, 503, 504 and 505. These idle periods correspond to the read-read timing pads 508 that provide a time delay during which channel control state transitions occur, note that as illustrated in FIG. 11B, SGATE and, consequently, parameter select signals 262, 266, 270, and 275 control signals transition during these idle periods. RGATE and BGATE assertion and negation times are precisely coordinated with the beginning and end, respectively, of the track elements to be operated on. Ideally, idle periods (states) have very brief duration to the end that they use a very small part of the disk rotational period. For convenience of illustration, the relative durations of servo track segments 502 and 506, data sectors 503, 504 and 505 as well the idle periods are distorted. The length of both servo track segments 502 and 506 and all idle periods are greatly expanded relative to the length of data sectors 503, 504 and 505 for convenience of illustration.

The control flow illustrated in FIG. 11A and the timing sequences illustrated in FIG. 11B are repeated numerous times during each disk revolution, the number of repetitions depending upon the zone dependent track format being processed.

The parameter switching circuits and means and the state trap circuits and means included in channel 26 make it possible to change read channel 200 operational state instantaneously when multiplexing between servo track segment 68 and data sector 92 processing. This contrasts with conventional read channel designs that employ operational state reacquisition after each juncture between servo track segment 68 and data sector 92. In the conventional approach, each such transition first requires an automatic gain control field and then a PLL field both having sufficient length to allow the read channel circuits to stabilize before the actual data to be recovered arrives at the operative transducer. In addition, conventional channels often require use of separate timing recovery circuits for servo data and user data because a single loop cannot easily be designed to be able to quickly acquire and track different servo and data frequencies in the track yet have desirable stability during actual data recovery.

Four parameter select signal sets have been defined in the preceding discussion, they are parameter select signals 262, 266, 270, and 275. Each of these control signal sets control different parts of read channel 200 as illustrated in FIG. 5. Preferably, another set of control signals provides a parameter select signal to control parameter switching for CPM 215. Parameter select signal 262 controls AGC and CTF circuit 250; parameter select signal 266 controls data detection circuit 242; parameter select signal 270 controls timing recovery circuit 244; and parameter select signal 275 controls ENDEC circuit 246.

I claim:

1. A disk drive comprising:

a disk having a disk surface, the disk surface having a plurality of tracks arranged in an embedded servo format including servo track segments for storing servo data and data track segments for storing user data;

read means operative during a user-data read operation for reading data from the disk surface to produce a time-multiplexed analog read signal that during a revolution of the disk represents analog read servo data during each of a first set of time intervals and represents analog read user data during each of a second set of time intervals, the first set of time intervals including a first servo time interval and a second servo time interval, the second set of time intervals including a first user data time interval and a second user data time interval;

a sampled signal processing means being responsive to the time-multiplexed analog read signal for producing a plurality of detected read symbols representing recovered servo data and recovered user data, the sampled signal processing means generating a servo state variable while processing the time-multiplexed read signal during the first servo time interval and a user data state variable while processing the time-multiplexed read signal during the first user data time interval;

a servo state variable trap register for storing the servo state variable at the end of the first servo time interval;

a data state variable trap register for storing the user data state variable at the end of the first user data time interval; and control means for providing the stored servo state variable to the sampled signal processing means at the beginning of the second servo time interval, the control means providing the stored user data state variable to the sampled signal processing means at the beginning of the second user data time interval.

2. The disk drive of claim 1 wherein the sampled signal processing means includes a gain control circuit and the state variable is a gain control state variable.

3. The disk drive of claim 1 wherein the sampled signal processing means includes a timing recovery circuit and the state variable is a timing recovery circuit state variable.

4. The disk drive of claim 1 wherein the sampled signal processing means includes a finite impulse response filter and the state variable is a finite impulse response filter state variable.

* * * * *